US011303073B2

(12) United States Patent
Rhodes et al.

(10) Patent No.: US 11,303,073 B2
(45) Date of Patent: Apr. 12, 2022

(54) CHARGING INLET ASSEMBLY

(71) Applicant: TE Connectivity Services GmbH, Schaffhausen (CH)

(72) Inventors: Clara Marguerite Rhodes, Winston Salem, NC (US); Aaron James de Chazal, Rochester, MI (US); Hurley Chester Moll, Hershey, PA (US); Jeremy Christin Patterson, Winston Salem, NC (US); Kevin John Peterson, Kernersville, NC (US); David Bruce Sarraf, Elizabethtown, PA (US)

(73) Assignee: TE Connectivity Services GmbH

( * ) Notice: Subject to any disclaimer, the term of this patent is extended or adjusted under 35 U.S.C. 154(b) by 23 days.

(21) Appl. No.: 17/023,745

(22) Filed: Sep. 17, 2020

(65) Prior Publication Data

US 2022/0085557 A1 Mar. 17, 2022

(51) Int. Cl.

| | |
|---|---|
| ***H01R 13/66*** | (2006.01) |
| ***H01R 4/56*** | (2006.01) |
| ***B60L 53/16*** | (2019.01) |
| ***H02J 7/00*** | (2006.01) |
| ***H01R 13/447*** | (2006.01) |
| *H01R 13/629* | (2006.01) |

(52) U.S. Cl.

CPC .......... *H01R 13/6675* (2013.01); *B60L 53/16* (2019.02); *H01R 4/56* (2013.01); *H01R 13/447* (2013.01); *H02J 7/0045* (2013.01); *H01R 13/62938* (2013.01); *H01R 2201/26* (2013.01)

(58) Field of Classification Search

None

See application file for complete search history.

(56) References Cited

U.S. PATENT DOCUMENTS

| | | | | |
|---|---|---|---|---|
| 2019/0389321 | A1* | 12/2019 | Spincich | B60L 53/16 |
| 2020/0079305 | A1* | 3/2020 | Takizawa | H02J 7/0045 |
| 2020/0185847 | A1* | 6/2020 | Feldner | H01R 13/6658 |
| 2020/0223321 | A1* | 7/2020 | Myer | B60L 53/16 |

* cited by examiner

*Primary Examiner* — Oscar C Jimenez

(57) ABSTRACT

A charging inlet assembly for an electric vehicle includes a housing having a power connector including AC terminals and DC terminals. An AC terminal assembly is coupled to the housing and includes AC bus bars electrically connected to corresponding AC terminals at a separable mating interface. A DC connector is mechanically and electrically connect to the DC contact of the DC connector at a separable mating interface.

20 Claims, 16 Drawing Sheets

CHARGING INLET ASSEMBLY

BACKGROUND OF THE INVENTION

The subject matter herein relates generally to charging inlet assemblies.

Electric vehicles (EV) and hybrid electric vehicles (HEV) include battery systems for operating the vehicles. The battery systems are charged by a charging connector, which is coupled to a charging inlet assembly of the vehicle. Known charging inlet assemblies of vehicles are not without disadvantages. For instance, known charging inlet assemblies are bulky and occupy significant space within the panels of the vehicle. It is desirable to reduce the overall size of known charging inlet assemblies. Additionally, routing of the power cables from the charging inlet assemblies is difficult and can increase the overall size needed for the charging inlet assembly within the vehicle. Additionally, repair and replacement of components of the charging inlet assembly is difficult and may require disassembly and removal of the charging inlet assembly from the vehicle for complete replacement of the charging inlet assembly with a new charging inlet assembly. For example, the cable harnesses, the housings and the terminals may be replaced upon removal of the entire charging inlet assembly.

A need remains for a robust and reliable a charging inlet assembly.

BRIEF DESCRIPTION OF THE INVENTION

In embodiments herein, a charging inlet assembly for an electric vehicle is provided. The charging inlet assembly includes a housing extending between a front and a rear. The housing has a chamber at the rear. The housing has a power connector at the front for receiving a charging connector. The power connector includes AC terminal channels and DC terminal channels between the front and the rear. AC terminals are coupled to the housing. Each of the AC terminals include a mating pin and a terminating end opposite the mating pin. The mating pin is positioned in the corresponding AC terminal channel for mating with the charging connector. The terminating end is positioned in the chamber at the rear of the housing. The charging inlet assembly includes an AC terminal assembly received in the housing. The AC terminal assembly includes AC bus bars electrically connected to corresponding AC terminals. Each of the AC bus bars includes a separable mating interface configured to be electrically connected to AC contacts of an AC connector removably coupled to the housing. The charging inlet assembly includes DC terminals coupled to the housing. Each of the DC terminals include a mating pin and a terminating end opposite the mating pin. The mating pin is positioned in the corresponding DC terminal channel for mating with the charging connector. The terminating end is positioned in the chamber at the rear of the housing. The terminating end includes a threaded element configured to mate with a mating threaded element of a DC connector to mechanically and electrically connect to a DC contact of the DC connector removably coupled to the housing.

In another embodiment, a charging inlet assembly for an electric vehicle is provided. The charging inlet assembly includes a housing extending between a front and a rear. The housing has a chamber at the rear. The housing has a power connector at the front for receiving a charging connector. The power connector includes AC terminal channels and DC terminal channels between the front and the rear. The charging inlet assembly includes AC terminals coupled to the housing. Each of the AC terminals include a mating pin and a terminating end opposite the mating pin. The mating pin is positioned in the corresponding AC terminal channel for mating with the charging connector. The terminating end is positioned in the chamber at the rear of the housing. The charging inlet assembly includes an AC terminal assembly received in the housing. The AC terminal assembly includes AC bus bars electrically connected to corresponding AC terminals. Each of the AC bus bars include a mating interface. The charging inlet assembly includes an AC connector having an AC connector housing coupled to the rear of the housing. The AC connector includes AC contacts held by the AC connector housing. The AC connector includes AC power cables extending into the AC connector housing being terminated to the AC contacts. Each of the AC contacts have a separable contact interface mated with the mating interface of the corresponding AC bus bar when the AC connector is coupled to the housing and unmated from the AC bus bar when the AC connector is uncoupled from the housing. The charging inlet assembly includes DC terminals coupled to the housing. Each of the DC terminals include a mating pin and a terminating end opposite the mating pin. The mating pin is positioned in the corresponding DC terminal channel for mating with the charging connector. The terminating end is positioned in the chamber at the rear of the housing. The charging inlet assembly includes a DC connector having at least one DC connector housing coupled to the rear of the housing. The DC connector includes DC contacts held by the DC connector at least one housing. The DC connector includes DC power cables extending into the at least one DC connector housing being terminated to the DC contacts. Each of the DC contacts have a separable contact interface configured to be electrically connected to the corresponding DC terminal.

In a further embodiment, a charging inlet assembly for an electric vehicle is provided. The charging inlet assembly includes a housing extending between a front and a rear. The housing has a chamber at the rear. The housing has a power connector at the front for receiving a charging connector. The power connector includes DC terminal channels between the front and the rear. The charging inlet assembly includes DC terminals coupled to the housing. The DC terminals include mating pins and terminating ends opposite the mating pins. The mating pins are positioned in the corresponding DC terminal channels for mating with the charging connector. The terminating ends are positioned in the chamber at the rear of the housing. The terminating ends include threaded elements. The charging inlet assembly includes a DC connector having at least one DC connector housing coupled to the rear of the housing. The DC connector includes DC contacts held by the at least one DC connector housing. The DC connector includes DC power cables extending into the at least one DC connector housing being terminated to the DC contacts. The DC contacts have mating ends. The DC connector includes mating threaded elements coupled to the mating ends of the DC contacts and is configured to be threadably coupled to the threaded elements at the terminating ends of the DC terminals to define separable mating interfaces between the DC contacts and the DC terminals for mating and unmating the DC connector from the housing.

DETAILED DESCRIPTION OF THE INVENTION

Figure 1:
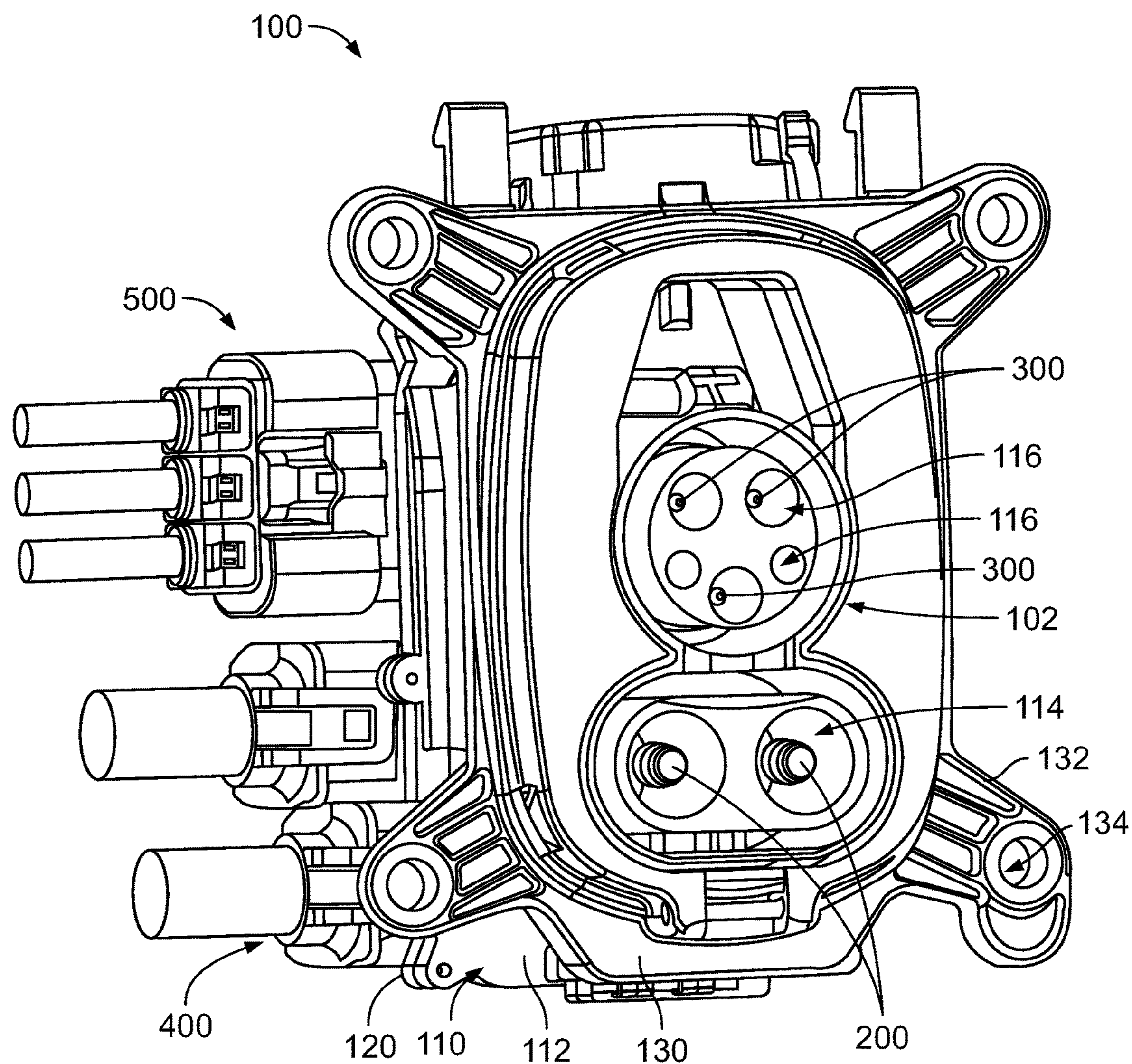
FIG. 1 is a front perspective view of a charging inlet assembly in accordance with an exemplary embodiment.
Figure 2:
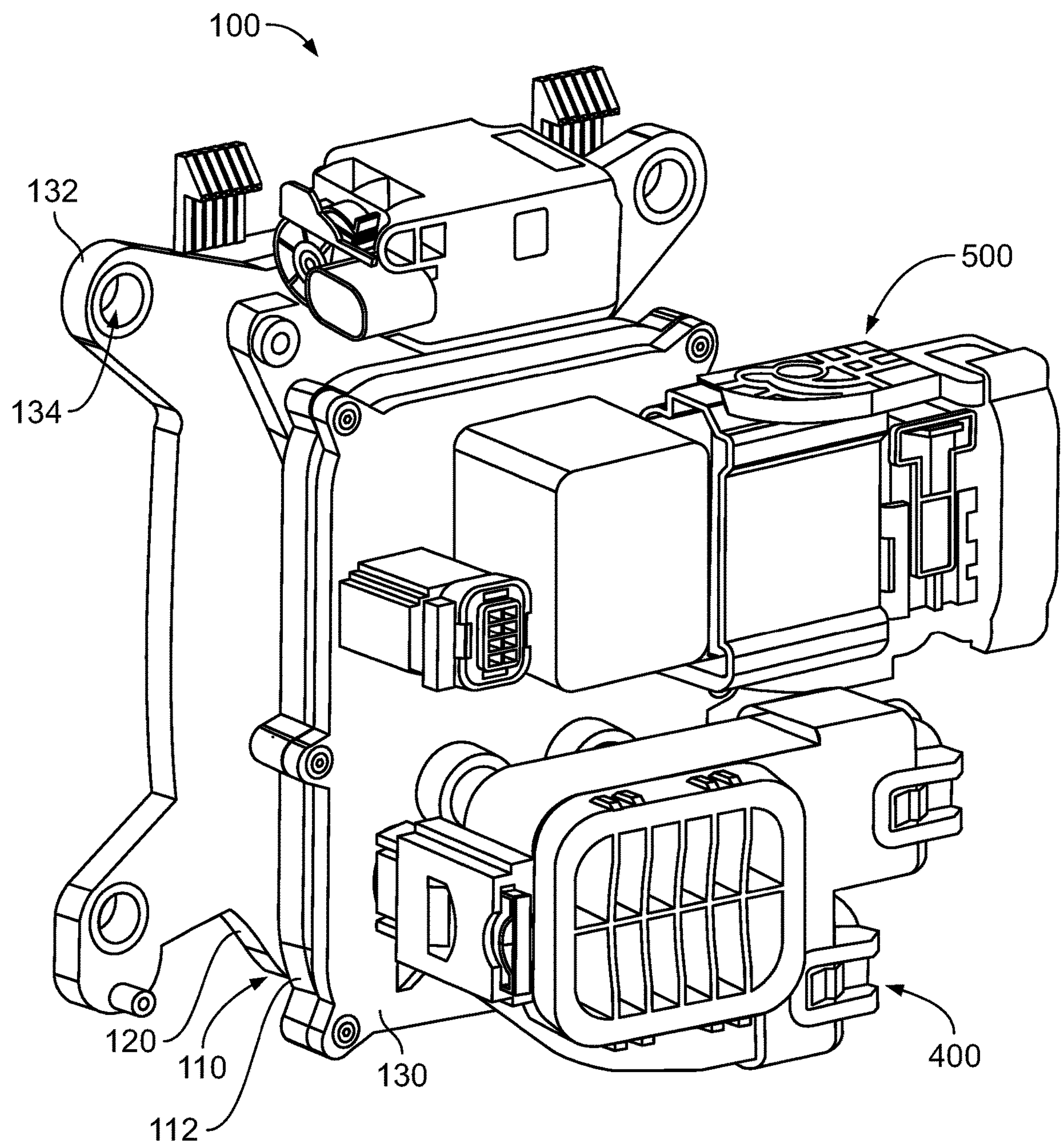
FIG. 2 is a rear perspective view of the charging inlet assembly in accordance with an exemplary embodiment.

FIG. 1 is a front perspective view of a charging inlet assembly 100 in accordance with an exemplary embodiment. FIG. 2 is a rear perspective view of the charging inlet assembly 100 in accordance with an exemplary embodiment. The charging inlet assembly 100 includes a power connector 102 configured to be electrically connected to a charging connector (not shown) for charging a battery system of a vehicle, such as an electric vehicle (EV) or hybrid electric vehicle (HEV). In an exemplary embodiment, the power connector 102 is configured for mating with a DC fast charging connector, such as the SAE combo CCS charging connector, in addition to AC charging connectors, such as the SAE J1772 charging connector.

The charging inlet assembly 100 includes a housing 110 holding the various components of the charging inlet assembly 100. In an exemplary embodiment, the housing 110 is a multi-piece housing including a main housing 112, a rear housing 120 coupled to the rear of the main housing 112, and a front housing 130 coupled to a front of the main housing 112. The rear housing 120 is coupled to a rear of the main housing 110 to enclose various components of the charging inlet assembly 100. For example, a cavity or chamber may be defined by the main housing 112 and/or the rear housing 120.

The housing 110 holds DC terminals 200 and AC terminals 300 forming part of the power connector 102. For example, the DC terminals 200 are received in corresponding terminal channels 114 of the main housing 112 and the AC terminals 300 are received in corresponding terminal channels 116 of the main housing 112. The DC terminals 200 may be coupled to the main housing 112 in the terminal channels 114 and the AC terminals 300 may be coupled to the main housing 112 in the terminal channels 116. The DC terminals 200 and/or the AC terminals 300 are configured to be mated to the charging connector.

The DC terminals 200 are configured to be electrically connected to a removable DC connector 400. In an exemplary embodiment, the DC connector 400 is coupled to the rear housing 120 (FIG. 2) of the charging inlet assembly 100 at a separable interface. The DC connector 400 is removable to allow repair or replacement of components of the charging inlet assembly 100 without removing the housing 110 from the vehicle.

The AC terminals 300 are configured to be electrically connected to a removable AC connector 500. In an exemplary embodiment, the AC connector 500 is coupled to the rear housing 120 of the charging inlet assembly 100 at a separable interface. The AC connector 500 is removable to allow repair or replacement of components of the charging inlet assembly 100 without removing the housing 110 from the vehicle.

The front housing 130 (FIG. 1) is coupled to the main housing 110 at a front of the charging inlet assembly 100. The front housing 130 may be clipped onto the main housing 110, such as using clips or latches. Other types of securing features, such as fasteners may be used in alternative embodiments. Alternatively, the front housing 130 may be integral with the main housing 110. The front housing 130 is used to couple the charging inlet assembly 100 to the vehicle. The front housing 130 includes mounting tabs 132 having openings 134 that receive fasteners (not shown) used to secure the charging inlet assembly 100 to the vehicle. Other types of mounting features may be used to secure the charging inlet assembly 100 to the vehicle. The front housing 130 may include a seal to seal the charging inlet assembly 100 to the vehicle. Optionally, the charging inlet assembly 100 may include a terminal cover (not shown) hingedly coupled to the front housing 130 and/or the main housing 110. The terminal cover is used to cover corresponding terminals 200.

Figure 3:
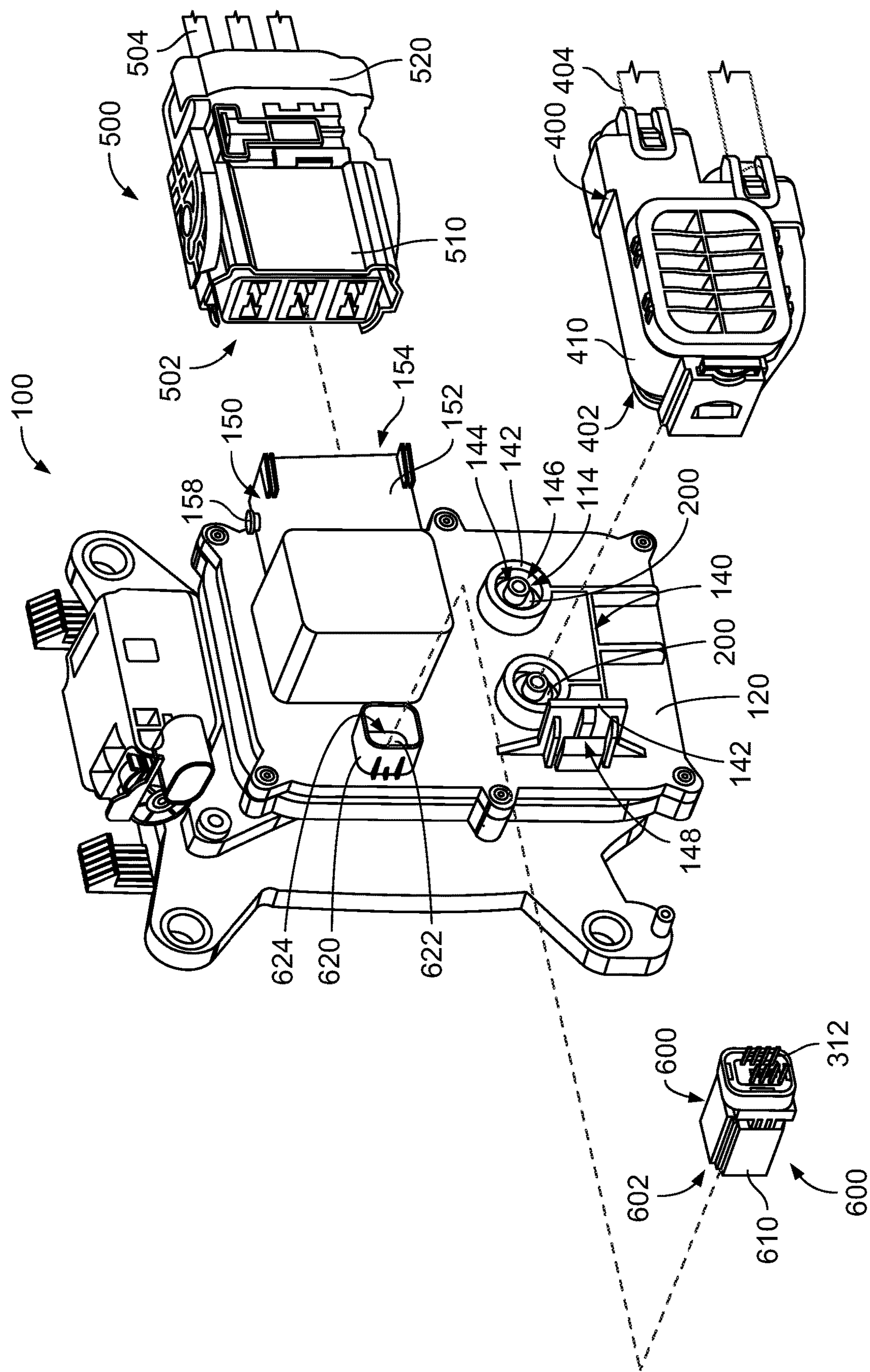
FIG. 3 is a partially exploded view of the charging inlet assembly in accordance with an exemplary embodiment.
Figure 4:
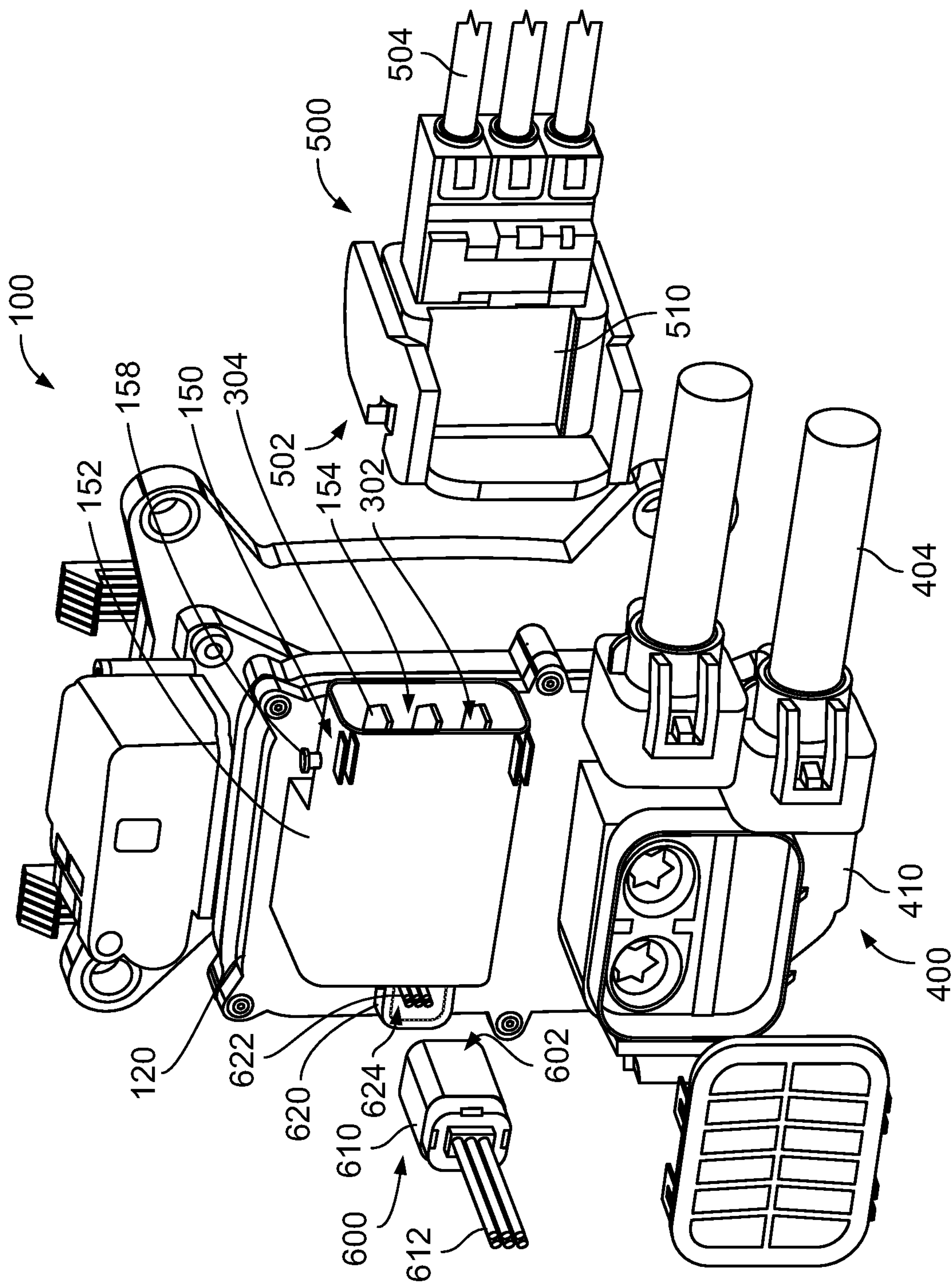
FIG. 4 is a partially exploded view of the charging inlet assembly in accordance with an exemplary embodiment.

FIG. 3 is a partially exploded view of the charging inlet assembly 100 in accordance with an exemplary embodiment showing the DC connector 400 and the AC connector 500 poised for coupling to the rear of the charging inlet assembly 100. FIG. 4 is a partially exploded view of the charging inlet assembly 100 in accordance with an exemplary embodiment. The DC connector 400 is configured to be coupled to the rear housing 120 at a first separable interface 402. The AC connector 500 is configured to be coupled to the rear housing 120 at a second separable interface 502.

In an exemplary embodiment, the charging inlet assembly 100 further includes a low voltage (LV) connector 600 configured to be removably coupled to the rear housing 120 at a third separable interface 602. The LV connector 600 may be electrically connected to a battery control unit (not shown) of the battery system. The LV connector 600 may transmit data between the charging inlet assembly 100 and the battery system, such as data relating to the charging operation. For example, the LV connector 600 may transmit data relating to charging start/stop, operating temperature of the DC terminals 200 and/or the AC terminals 300, or other charging data. The LV connector 600 includes a housing 610 holding LV contacts (not shown). The LV contacts are electrically connected to corresponding LV wires 612. The LV housing 610 is configured to be coupled to a LV connector shroud 620 of the rear housing 120 to mate with LV contacts 622 of the charging inlet assembly 100. The LV housing 610 may be latchably coupled to the LV connector shroud 620 to allow the LV connector 600 to be removed from the rear housing 120. In an exemplary embodiment, the LV connector shroud 620 includes a LV receptacle 624 and a portion of the LV connector 600 is plugged into the LV receptacle 624. In alternatively embodiments, the LV connector shroud 620 may form a plug rather than a receptacle. Other types of mating interfaces may be provided in alternative embodiments.

In an exemplary embodiment, the DC connector 400 is electrically connected to the battery system, such as for charging the batteries of the vehicle. The DC connector 400 transmits DC power from the charging inlet assembly 100 to the battery system through DC power cables 404. FIG. 3 shows the DC connector 400 unmated from the rear housing 120 while FIG. 4 shows the DC connector 400 mated to the rear housing 120, but having a portion of the DC connector open to illustrate components of the DC connector 400. The DC connector 400 includes a DC connector housing 410 holding DC contacts 450, which are electrically connected to the DC power cables 404. In various embodiments, the DC connector housing 410 holds two DC contacts 450 terminated to ends of a pair of DC power cables 404. However, in alternative embodiments, separate DC connector housings 410 may be provided, each holding an individual DC contact terminated to a corresponding DC power cable, wherein the DC connector housings 410 may be individually and separately coupled to the rear housing 120.

In an exemplary embodiment, the rear housing 120 of the charging inlet assembly 100 includes a DC connector shroud 140. The DC connector shroud 140 includes walls 142 defining one or more receptacles 144 configured to receive a portion of the DC connector 400. The DC connector shroud 140 includes openings 146 through the rear housing 120 aligned with the terminal channels 114. The openings 146 are aligned with the DC terminals 200. In various embodiments, ends of the DC terminals 200 may extend through the openings 146 into the receptacles 144 for mating with the DC connector 400 at the separable mating interface 402. In an exemplary embodiment, the DC connector shroud 140 is open at a rear to allow mating and unmating of the DC connector 400 along a mating axis that is parallel to the DC terminals 200. Optionally, the DC power cables 404 may extend from the DC connector 400 in a direction perpendicular to the mating axis, such as for a low-profile cable exit direction. In an exemplary embodiment, the DC connector shroud 140 includes a securing feature 148 for securing the DC connector 400 to the rear housing 120. For example, the securing feature 148 may include a latch in various embodiments. The latch is deflectable to unlatch from the DC connector 400 and allow the DC connector to be removed from the rear housing 120. Other types of securing features 158 may be provided in alternative embodiments, such as latching tabs, threaded bores, fasteners, clips, and the like.

In an exemplary embodiment, the AC connector 500 is electrically connected to the battery system, such as for charging the batteries of the vehicle. The AC connector 500 transmits AC power from the charging inlet assembly 100 to the battery system through AC power cables 504. The AC connector 500 includes an AC connector housing 510 holding AC contacts 550, which are electrically connected to the AC power cables 504. In various embodiments, the AC connector housing 510 holds three AC contacts 550 (for example, line, ground, neutral) terminated to ends of AC power cables 504. However, in alternative embodiments, separate AC connector housings 510 may be provided, each holding an individual AC contact terminated to a corresponding AC power cable, wherein the AC connector housings 510 may be individually and separately coupled to the rear housing 120.

In an exemplary embodiment, the rear housing 120 of the charging inlet assembly 100 includes an AC connector shroud 150. The AC connector shroud 150 includes walls 152 defining one or more receptacles 154 configured to receive a portion of the AC connector 500. In an exemplary embodiment, the AC connector shroud 150 is open at a side to allow mating and unmating of the AC connector 500 along a mating axis that is oriented in a side-to-side direction. The mating axis may be perpendicular to the mating axis. Optionally, the AC power cables 504 may extend from the AC connector 500 in a direction parallel to the mating axis 157, such as for a low-profile cable exit direction. In an exemplary embodiment, the AC connector shroud 150 includes a securing feature 158 for securing the AC connector 500 to the rear housing 120. For example, the securing feature 158 may include latching tabs in various embodiments. Other types of securing features 158 may be provided in alternative embodiments, such as deflectable latches, threaded bores, fasteners, clips, and the like.

Figure 5:
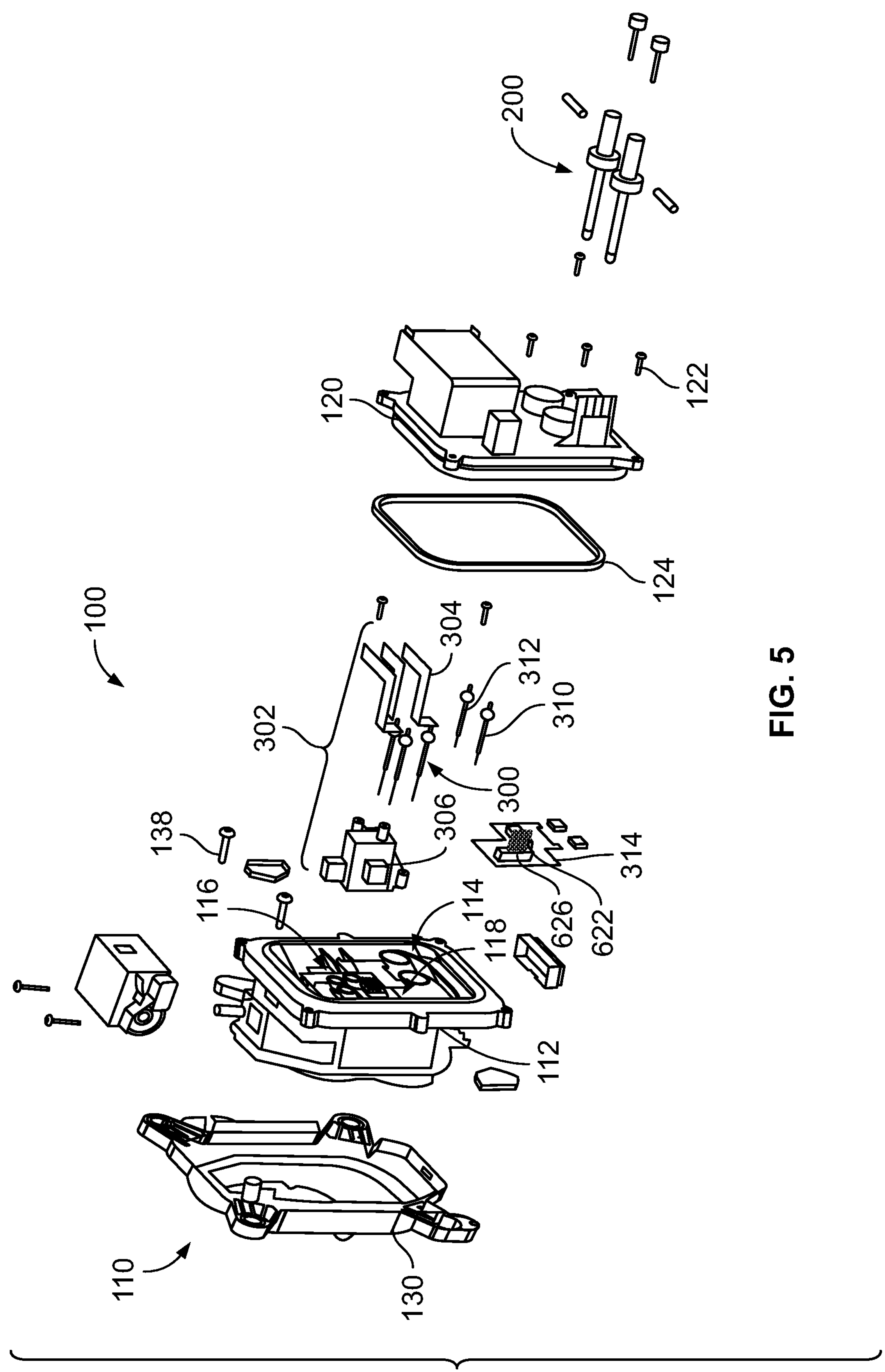
FIG. 5 is an exploded view of the charging inlet assembly in accordance with an exemplary embodiment.

FIG. 5 is an exploded view of the charging inlet assembly 100 in accordance with an exemplary embodiment. FIG. 5 illustrates various components configured to be received in the housing 110 of the charging inlet assembly 100. FIG. 5 shows the front housing 130 and the main housing 112 at the rear housing 120 rearward of the main housing 112. In an exemplary embodiment, the front housing 130 is coupled to the main housing 112 using fasteners 138. The rear housing 120 is configured to be coupled to the main house 112 using fasteners 122. In an exemplary embodiment, a peripheral seal 124 is configured to be positioned between the rear housing 120 main housing 112. The DC terminals 200 are aligned with the terminal channels 114 and the AC terminals 300 are aligned with terminal channels 116. The DC terminals 200 may be rear loaded into the terminal channels 114 through the rear of the main housing 112. The AC terminals 300 may be rear loaded into the terminal channels 116 through the rear of the main housing 112.

In an exemplary embodiment, the AC terminals 300 are part of an AC terminal assembly 302. The AC terminal assembly 302 is received in the housing 110, such as in a rear chamber 118 at the rear of the main housing 112. The rear housing 120 is configured to close the rear chamber 118 when the rear housing 120 is coupled to the main housing 112. The AC terminal assembly 302 includes the AC terminals 300 and AC bus bars 304 extending from the AC terminals 300. In various embodiments, the AC terminal assembly 302 includes a bus bar holder 306 configured to hold the AC bus bars 304. The bus bar holder 306 may position the AC bus bars 304 relative to each other. The bus bar holder 306 may electrically isolate the AC bus bars 304 from each other.

In an exemplary embodiment, the AC terminal assembly 302 includes a pilot terminal 310 and a proximity terminal 312 in addition to the AC terminals 300. The pilot terminal 310 and the proximity terminal 312 are received in corresponding terminal channels 116 in the main housing 112. The pilot terminal 310 and the proximity terminal 312 are configured to be mated with the charging connector when the charging connector is plugged into the charging inlet assembly 100. In an exemplary embodiment, the AC terminal assembly 302 includes a printed circuit board (PCB) 314 and an LV mating connector 626 coupled to the printed circuit board 314. The LV mating connector 626 holds the LV contacts 622. The LV contacts 622 are electrically connected to the PCB 314. The pilot terminal 310 and the proximity terminal 312 are electrically connected to the LV contacts 622 through the PCB 314. Optionally, one or more of the AC terminals 300 and/or the AC bus bars 304 may be coupled to the PCB 314.

Figure 6:
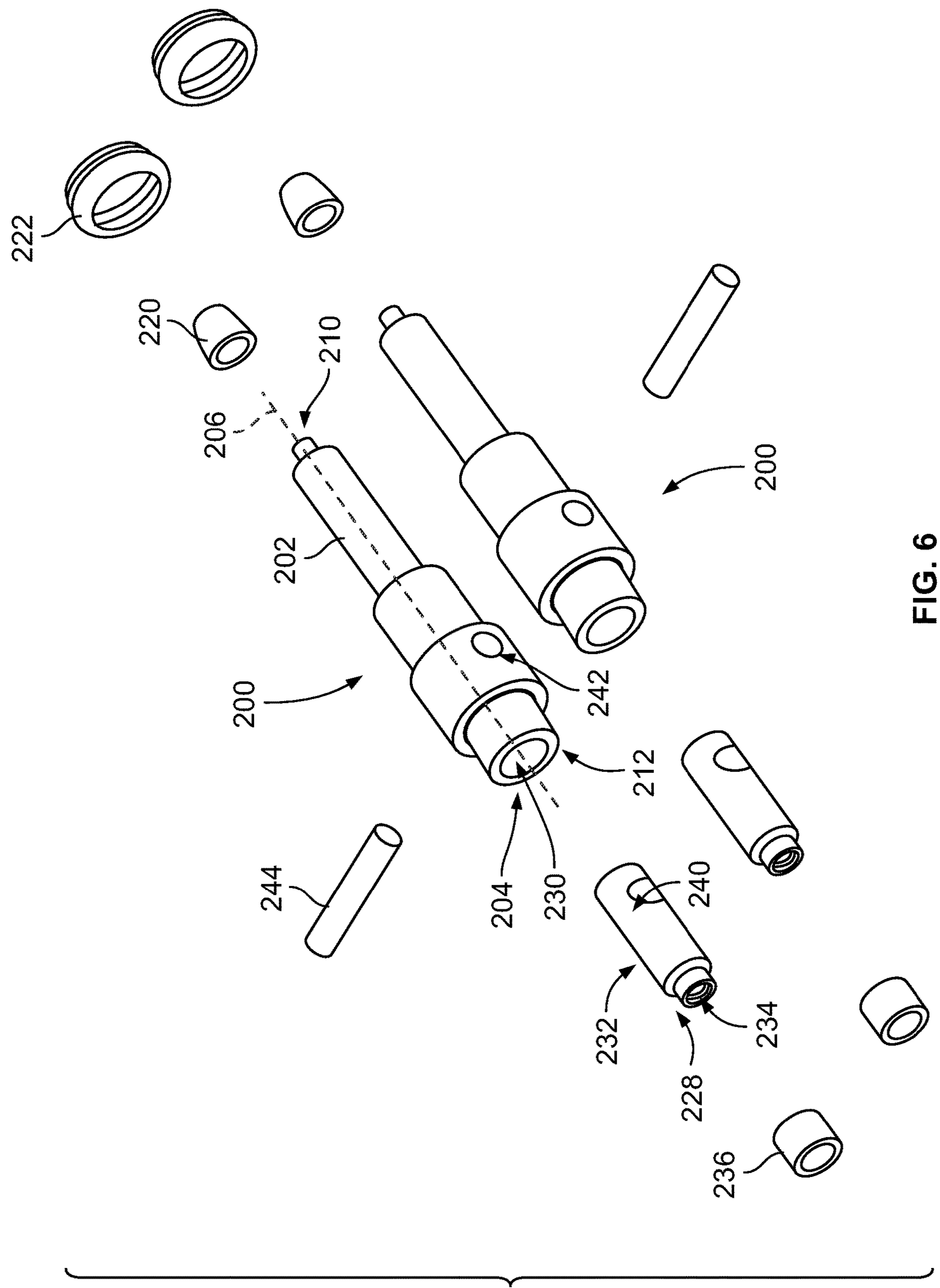
FIG. 6 is an exploded view of DC terminals of the charging inlet assembly in accordance with an exemplary embodiment.

FIG. 6 is an exploded view of the DC terminals 200 in accordance with an exemplary embodiment. Each DC terminal 200 includes a mating pin 202 at a front 210 of the terminal 200 and a terminating end 204 at a rear 212 of the terminal 200. The terminal 200 extends along a longitudinal axis 206. The mating pin 202 is configured to be mated to the charging connector. The terminating end 204 is configured to be electrically connected to the DC connector 400 (shown in FIG. 2) at the separable mating interface 402.

The DC terminal 200 is electrically conductive. For example, the DC terminal 200 may be manufactured from a metal material, such as a copper material. In an exemplary embodiment, the DC terminal 200 is screw machined. The DC terminal 200 may be manufactured from a metal alloy (for example, copper alloy) having additives to increase machinability. In an exemplary embodiment, the DC terminal 200 is generally cylindrical; however, the DC terminal 200 may have various diameters along the length of the DC terminal 200.

The mating pin 202 is at the front 210 of the DC terminal 200 for mating with the charging connector. In an exemplary embodiment, a touch proof lid 220 is provided at the tip of the mating pin 202. The touch proof lid 220 may be manufactured from a dielectric material, such as a plastic or rubber material. The touch proof lid 220 prevents inadvertent touching of the DC terminal 200.

In an exemplary embodiment, a seal 222 is configured to be coupled to the DC terminal 200 rearward of the mating pin 202. The seal 222 is used for interface sealing against an interior surface of the terminal channel 114 (shown in FIG. 5) when the DC terminal 200 is loaded into the terminal channel 114. In various embodiments, the seal 222 is ring-shaped.

In an exemplary embodiment, the DC terminal 200 includes threaded element 228 at the terminating end 204. The threaded element 228 is configured to mate with a mating threaded element of the DC connector 400. In the illustrated embodiment, the threaded element 228 is a female threaded element having internal threads; however, the threaded element 228 may be a male threaded element having external threads in alternative embodiments. In an exemplary embodiment, the DC terminal 200 includes a bore 230 at the terminating end 204. A threaded insert 232 is received in the bore 230. The threaded insert 232 has an internally threaded bore 234 at a rear of the threaded insert 232. The threaded bore 234 is configured to receive a threaded fastener to electrically connect the DC terminal 200 to the DC connector 400. In an exemplary embodiment, a touch proof lid 236 is configured to be coupled to the rear end of the threaded insert 232. The touch proof lid 236 prevents inadvertent touching of the terminating end 204 of the DC terminal 200. In an exemplary embodiment, the threaded insert 232 includes an opening 240 therethrough. The opening 240 is provided along a side of the threaded insert 232. The DC terminal 200 includes an opening 242 at the terminating end 204. The opening 240 of the threaded insert 232 is configured to be aligned with the opening 242 to receive a pin 244 used to hold the threaded insert 232 in the bore 230. The pin 244 may be a spring pin configured to engage the openings 240, 242 by an interference fit. The pin 244 prevents rotation of the threaded insert 232 relative to the DC terminal 200 within the bore 230. The threaded insert 232 is manufactured from a conductive material, such as a steel material. The threaded insert 232 may be manufactured from a different material than the DC terminal 200, such as a harder material for forming and maintaining the threads within the threaded bore 234. The threaded insert 232 is configured to be electrically connected to the DC terminal 200 to allow electrical connection between the DC terminal 200 and the DC connector 400. In various embodiments, the pin 244 electrically connects the threaded insert 232 with the DC terminal 200.

The DC terminal 200 may have other sizes, shapes or features in alternative embodiments. For example, in various embodiments, rather than having a separate threaded insert 232, the terminating end 204 of the DC terminal 200 may have the threaded bore 234 formed directly in the material of the DC terminal 200. In such embodiments, the DC connector 400 may be mechanically and electrically connected directly to the DC terminal 200 rather than being connected via the threaded insert 232. In other alternative embodiments, the DC terminal 200 may include a threaded stud extending rearward from the terminating end 204 of the DC terminal 200 rather than a threaded bore. In other various embodiments, the DC terminal 200 may have other types of separable mating interfaces rather than a threaded mating interface. For example, the DC terminal 200 may include a pin, a socket, a blade, a receptacle, or another type of separable mating interface.

Figure 7:
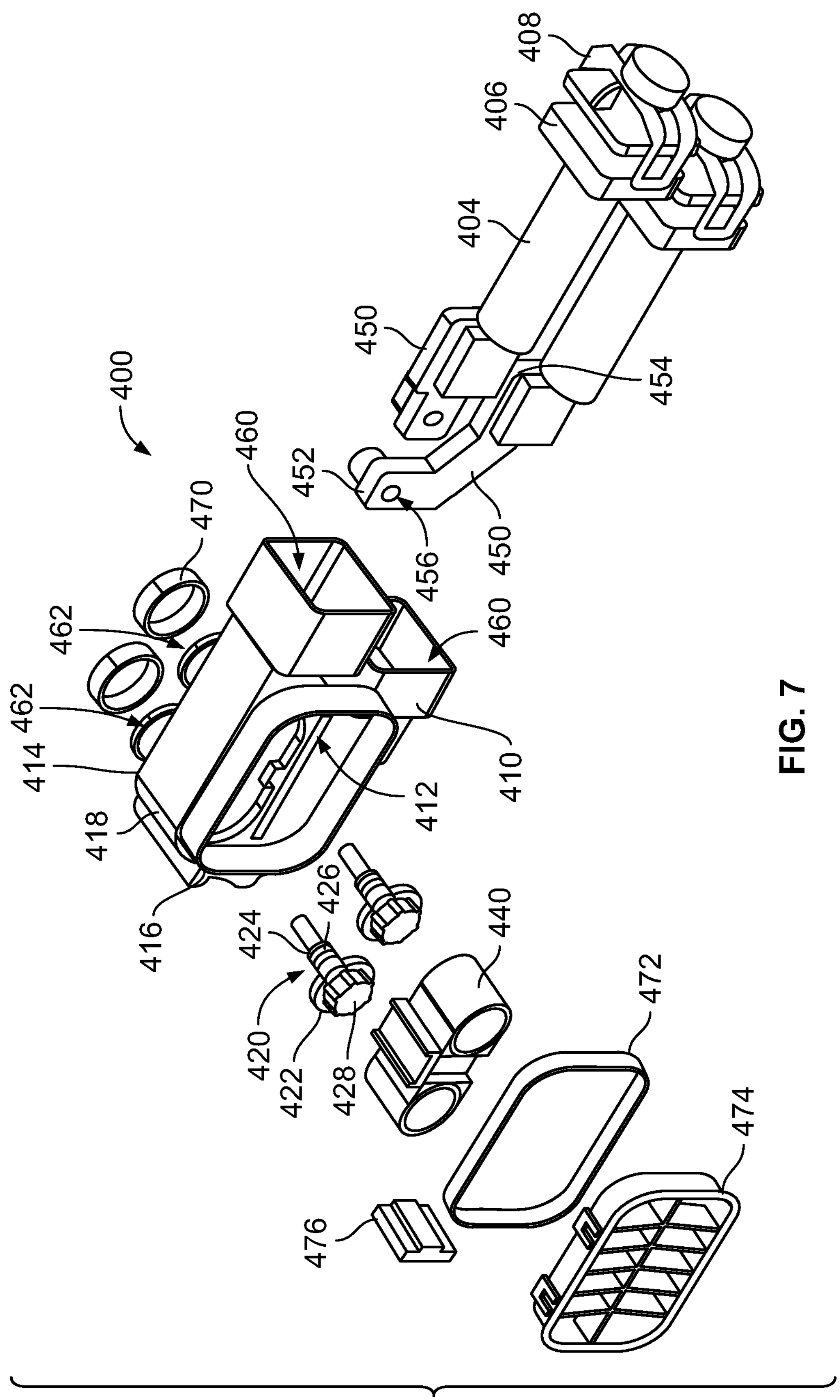
FIG. 7 is an exploded view of a DC connector of the charging inlet assembly in accordance with an exemplary embodiment.

FIG. 7 is an exploded view of the DC connector 400 in accordance with an exemplary embodiment. The DC connector 400 includes the DC contacts 450 coupled to ends of the DC power cables 404. The DC contacts 450 and the DC power cables 404 may be loaded into a cavity 412 of the DC connector housing 410. In an exemplary embodiment, the DC connector 400 includes threaded elements 420 configured to be threadably coupled to the threaded elements 228 of the DC terminal 200. In the illustrated embodiment, the threaded elements 420 are male threaded elements having external threads; however, the threaded elements 420 may be female threaded elements having internal threads in alternative embodiments. In the illustrated embodiment, the threaded elements 420 are threaded fasteners and may be referred to hereinafter as threaded fasteners 420. The threaded fasteners 420 are configured to be coupled to the DC contacts 450. The threaded fasteners 420 are configured to be coupled to the DC terminals 200 (shown in FIG. 6) at a separable mating interface. For example, the threaded fasteners 420 may be received in the threaded bore 234 of the DC terminal 200 to mechanically and electrically connect the DC contacts 450 to the DC terminals 200. In an exemplary embodiment, the DC connector 400 includes a contact holder 440 used to hold the DC contacts 450. The contact holder 440 may be received in the cavity 412 to position the DC contacts 450 relative to each other. In an exemplary embodiment, the contact holder 440 is manufactured from a dielectric material, such as a plastic material, to electrically isolate the DC contacts 450 from one another.

Each DC contact 450 extends between a mating end 452 and a terminating end 454. In various embodiments, the DC contacts 450 may be shaped differently for positioning the DC contacts 450 in the DC connector housing 410. For example, the mating ends 452 of the DC contacts 450 may be horizontally aligned with each other and one of the DC contacts 450 may be transitioned such that the terminating ends 454 are vertically aligned with each other. The terminating end 454 is configured to be terminated to the DC power cable 404. In an exemplary embodiment, the DC contacts 450 may be welded to the DC power cables 404. However, the DC contacts 450 may be terminated by other means in alternative embodiments, such as being crimped to ends of the DC power cables 404. In an exemplary embodiment, the mating end 452 includes an opening 456 configured to receive the threaded fastener 420. Optionally, the opening 456 may be threaded. Alternatively, the opening 456 may be a smooth bore allowing the threaded fastener 420 to pass therethrough for mating to and unmated from the DC terminal 200.

In an exemplary embodiment, the threaded fasteners 420 are threaded bolts having an external threads. Each threaded fastener 420 includes a head 422 and a shaft 424. The shaft 424 includes the external threads 426. In an exemplary embodiment, the head 422 includes a touch proof lid 428 covering the head 422. The touch proof lid 428 prevent inadvertent touching of the threaded fasteners 420. Optionally, the tips of the shaft 424 may include touch proof features, such as caps. The head 422 is shaped to include features for rotating the threaded fastener 420 for threadably coupling the threaded fastener 420 to the DC terminal 200. For example, the head 422 may include angular surfaces may be engaged by a tool, such as a socket, for rotating the threaded fastener 420. In an alternative embodiment, rather than being a threaded screw, the threaded fastener 420 may be a threaded nut having internal threads, such as for threadably coupling to a threaded shaft extending from the DC terminal 200.

The DC connector housing 410 extends between a front 414 and a rear 416. The DC connector housing 410 includes side walls 418 between the front 414 and the rear 416. The side walls 418 surround the cavity 412. During assembly, the DC contacts 450 and the DC power cables 404 are loaded into the DC connector housing 410. For example, the DC contacts 450 and the DC power cables 404 may be loaded into ports 460 formed in the side walls 418 at one or more sides of the DC connector housing 410. In the illustrated embodiment, the ports 460 are provided at the same side of the DC connector housing 410. However, the ports 460 may be provided at opposite sides and/or the top and/or the bottom in alternative embodiments. In an exemplary embodiment, a cable seal 406 is provided at the end of each DC power cable 404. The cable seal 406 may be loaded into the port 460 to provide a seal between the DC power cable 404 and the DC connector housing 410. In an exemplary embodiment, a strain relief 408 is provided at the end of each DC power cable 404. The strain relief 408 may be latchably coupled to the DC connector housing 410 to secure the strain relief 408 relative to the DC connector housing 410. The strain relief 408 provides strain relief for the DC power cable 404.

During assembly, the contact holder 440 is configured to be loaded into the cavity 412 such as through the rear 416 of the DC connector housing 410. The DC contacts 450 may be coupled to the contact holder 440. The contact holder 440 holds relative positions of the mating ends 452 of the DC contacts 450. In an exemplary embodiment, the contact holder 440 aligns the mating ends 452 with ports 462 at the front 414 of the DC connector housing 410. The contact holder 440 positions the mating ends 452 to receive the threaded fasteners 420. In an exemplary embodiment, the threaded fasteners 420 may be loaded through the opening in the rear 416 of the DC connector housing 410 to mechanically and electrically connect the DC contacts 450 with the corresponding DC terminals 200 after the DC connector 400 is coupled to the rear housing 120 of the charging inlet assembly 100.

In an exemplary embodiment, cover seals 470 may be provided at the front 414 of the DC connector housing 410. The cover seals 470 surround the ports 462. The cover seals 470 are configured to engage the rear housing 120 to seal the DC connector 400 to the rear housing 120. In an exemplary embodiment, a peripheral seal 472 is received in the opening at the rear 416 of the DC connector housing 410. A rear cover 474 is coupled to the rear 416 of the DC connector housing 410 to close the opening. The rear cover 474 engages the peripheral seal 472 to seal off the opening. In an exemplary embodiment, a latching feature 476 may be used to secure the DC connector housing 410 to the rear housing 120.

Figure 8:
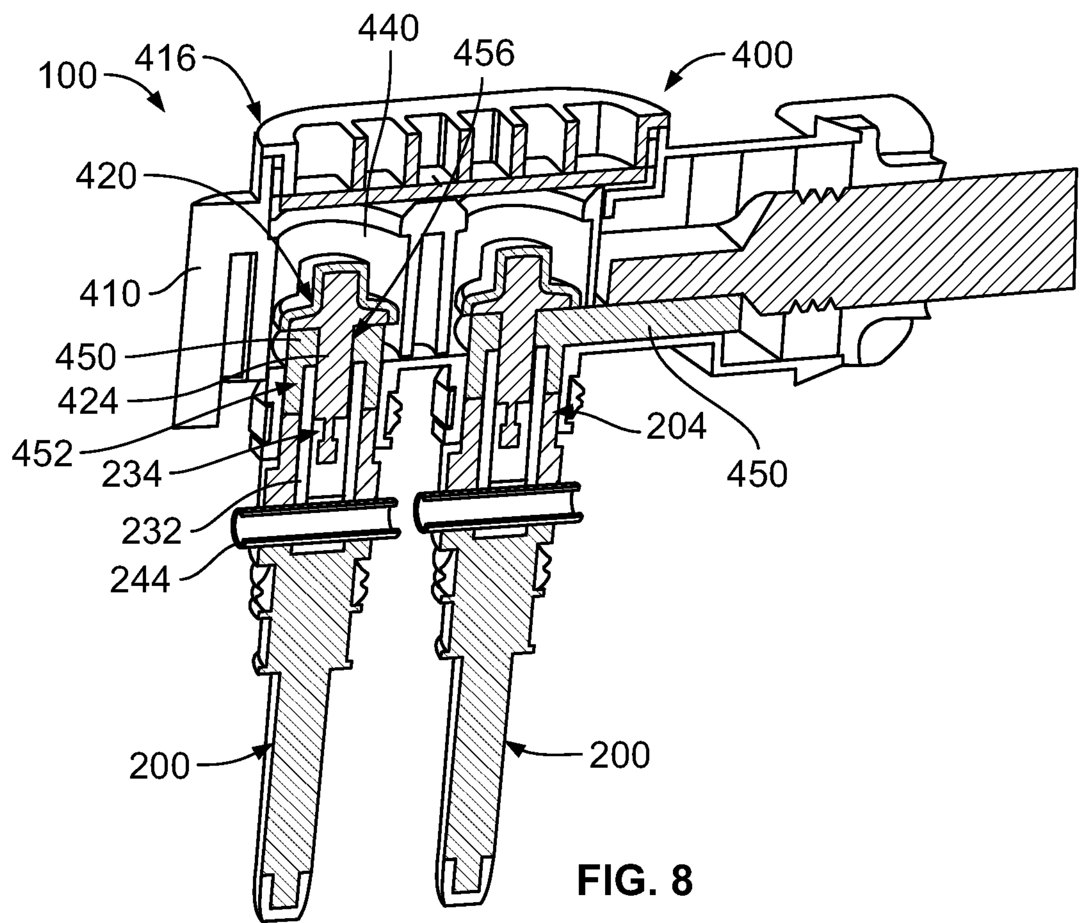
FIG. 8 is a partial sectional view of a portion of the charging inlet assembly showing the DC connector coupled to the DC terminals in accordance with an exemplary embodiment.
Figure 9:
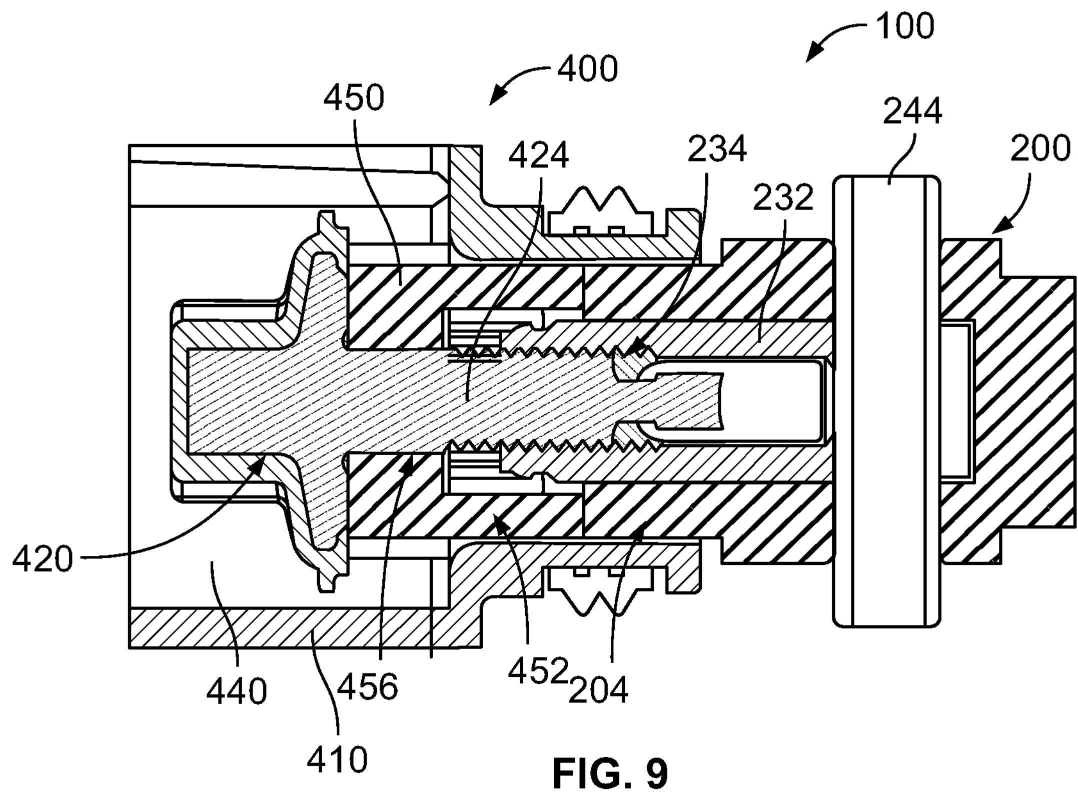
FIG. 9 is a cross-sectional view of a portion of the charging inlet assembly showing a portion of the DC connector coupled to one of the DC terminals in accordance with an exemplary embodiment.

FIG. 8 is a partial sectional view of a portion of the charging inlet assembly 100 showing the DC connector 400 coupled to the DC terminals 200. FIG. 9 is a cross-sectional view of a portion of the charging inlet assembly 100 showing a portion of the DC connector 400 coupled to one of the DC terminals 200. When the DC connector 400 is coupled to the rear housing 120 of the charging inlet assembly 100, the DC contacts 450 may be electrically connected to the DC terminals 200 at a separable mating interface. For example, the threaded fasteners 420 may be used to couple the DC contacts 450 to the DC terminals 200. The threaded fasteners 420 may be removed to allow the DC connector 400 2B unmated from the rear housing 120.

In an exemplary embodiment, the threaded fasteners 420 are rear loaded through the rear 416 of the DC connector housing 410 into the contact holder 440. The threaded shaft 424 of each threaded fastener 420 is loaded through the opening 456 and the corresponding DC contact 450. The threaded shaft 424 is loaded into the threaded bore 234 of the threaded insert 232 at the terminating end 204 of the DC terminal 200. The threaded fastener 420 is rotated into the threaded insert 232. The pin 244 prevents rotation of the threaded insert 232 as the threaded fastener 420 is rotated. The threaded fastener 420 is tightened to mechanically and electrically connect the DC contact 450 to the DC terminal 200. For example, the mating end 452 of the DC contact 450 may be driven inward toward the terminating end 204 of the DC terminal 200 to make direct physical contact between the DC contact 450 and the DC terminal 200. Additionally, or alternatively, an electrical path is created from the threaded insert 232 to the threaded fastener 420. The head 422 of the threaded fastener 420 is compressed against the DC contact 450 make electrical connection between the threaded fastener 420 and the DC contact 450.

Figure 10:
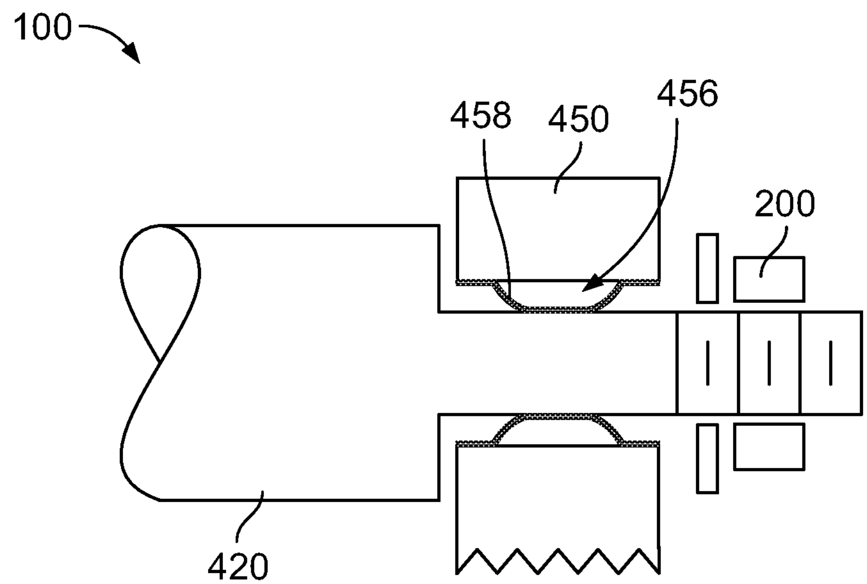
FIG. 10 is a cross-sectional view of a portion of the charging inlet assembly in accordance with an exemplary embodiment.

FIG. 10 is a cross-sectional view of a portion of the charging inlet assembly 100 showing an alternative connection between the threaded fastener 420 and the DC terminal 200. In the illustrated embodiment, a contact sleeve 458 is positioned in the opening 456 of the DC contact 450 to provide a reliable electrical connection between the threaded fastener 420 and the DC contact 450. The contact sleeve 458 may include a plurality of compressible elements extending into an internal bore of the contact sleeve. The compressible elements may be contact springs, which may be cantilevered beams, simply supported beams or fixed beams. The compressible elements extend between the DC contact 450 in the threaded fastener 420 to make an electrical connection between the DC contact 450 and the threaded fastener 420. In the illustrated embodiment, the contact sleeve 458 is generally tubular in shape having the contact springs bent or formed inward to engage the threaded fasteners 420. For example, the contact sleeve 458 may be hour-glass shaped. In various embodiments, the contact sleeve 458 is a Louvertac contacts.

Figure 11:
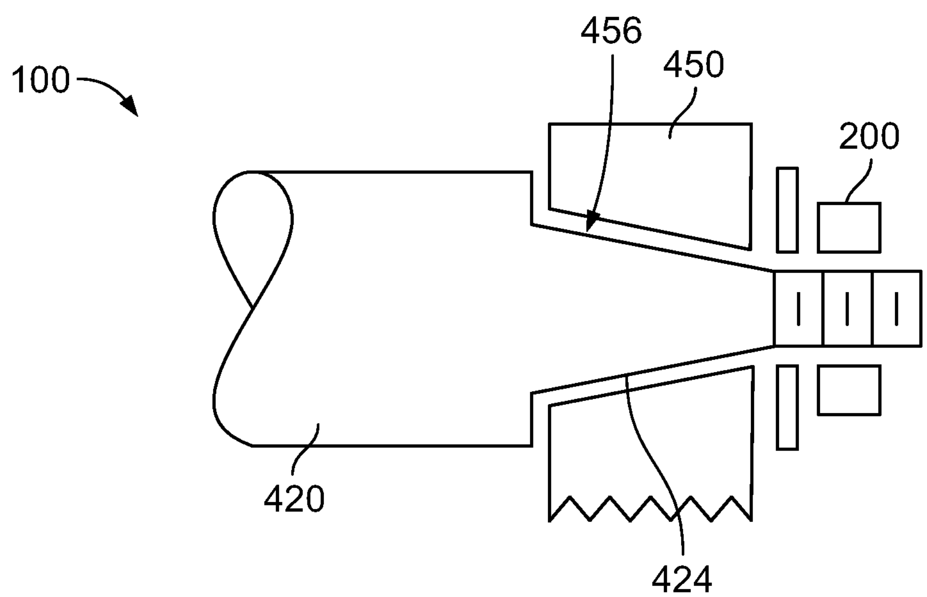
FIG. 11 is a cross-sectional view of a portion of the charging inlet assembly in accordance with an exemplary embodiment.

FIG. 11 is a cross-sectional view of a portion of the charging inlet assembly 100 showing an alternative connection between the threaded fastener 420 and the DC terminal 200. In the illustrated embodiment, the opening 456 and the DC contact 450 is tapered and the shaft 424 of the threaded fastener 420 is similarly tapered. As the threaded fastener 420 is threadably coupled to the DC terminal 200 the tapered shaft 424 is driven downward and pressed against the tapered opening 456 of the DC contact 450 to provide a reliable electrical connection between the threaded fastener 420 and the DC contact 450.

Figure 12:
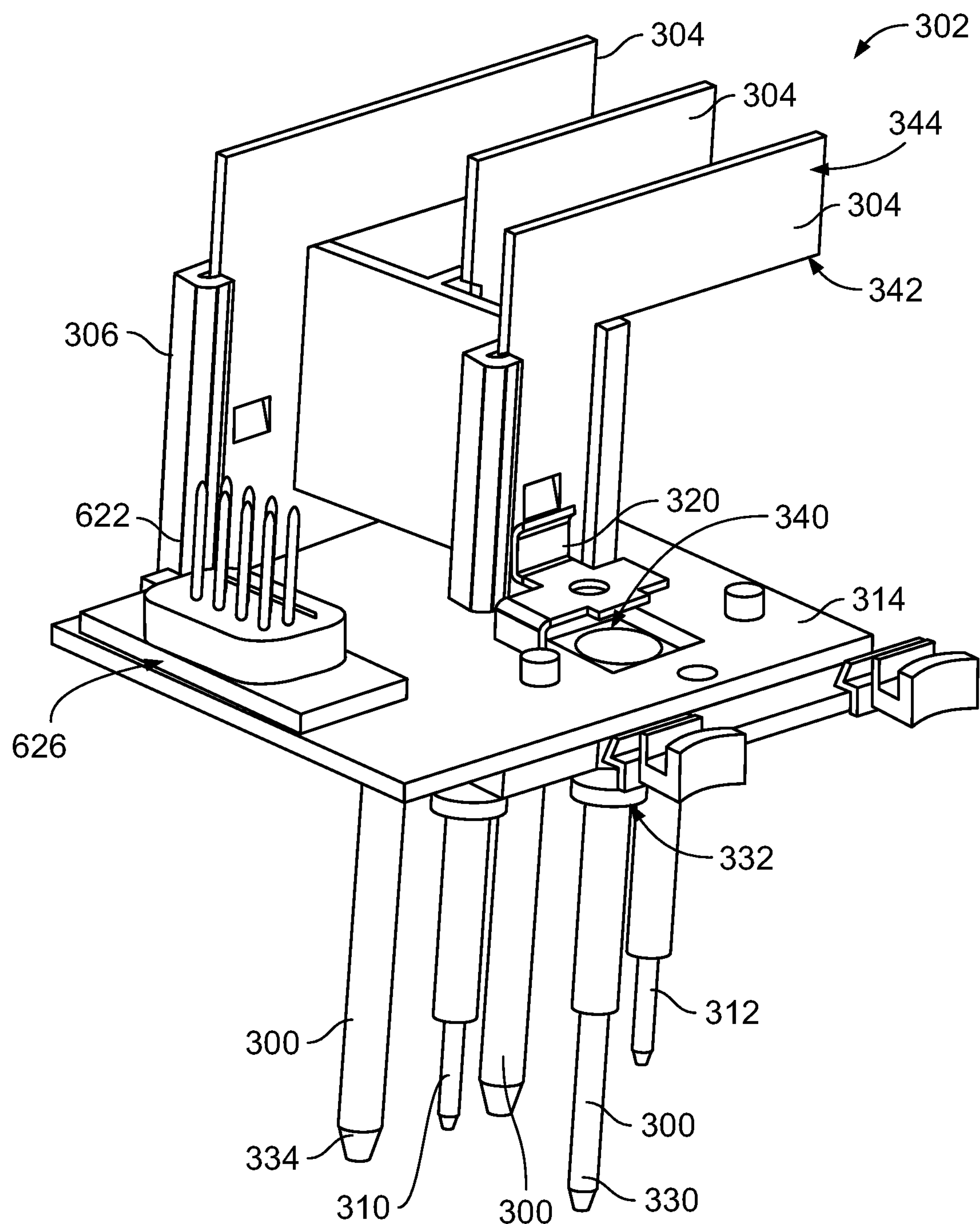
FIG. 12 is a perspective view of an AC terminal assembly of the charging inlet assembly in accordance with an exemplary embodiment.

FIG. 12 is a perspective view of the AC terminal assembly 302 in accordance with an exemplary embodiment. FIG. 12 shows the AC terminals 300, the pilot terminal 310 and the proximity terminal 312 extending forward of the PCB 314. FIG. 12 shows the AC bus bars 304 extending rearward of the PCB 314. The AC bus bars 304 are received in the bus bar holder 306. The bus bar holder 306 is coupled to the PCB 314 to support the AC bus bars 304 relative to the PCB 314. In an exemplary embodiment, a ground tab 320 is electrically connected to one of the AC bus bars 304 (for example, a ground bus bar) and electrically connected to the PCB 314. The pilot terminal 310 and the proximity terminal 312 may be electrically connected to the LV contacts 622 of the LV mating connector 626. In an exemplary embodiment, the AC terminals 300, the pilot terminal 310 and the proximity terminal 312 may be integrated with the AC terminal assembly 302 such that all of the terminals may be loaded into the housing 110 as a unit. For example, the locations of the ends of the terminals may be controlled relative to each other to ease assembly with the housing 110.

In an exemplary embodiment, each AC terminals 300 includes a mating pin 330 at a front of the AC terminal 300 and a terminating end 332 at a rear of the AC terminals 300. The mating pin 330 is configured be received in the corresponding terminal channel 116 (shown in FIG. 1) of the housing 110 for mating with the charging connector. The terminating end 332 is configured to be coupled to the corresponding AC bus bar 304. For example, the terminating end 332 may be welded to the AC bus bar 304. Alternatively, the terminating end 332 may be coupled to the AC bus bar 304 by other means, such as crimping, a threaded connection, and the like. In various embodiments, a touch proof lid 334 may be provided at the tip of the mating pin 330.

The AC bus bars 304 are held relative to each other by the bus bar holder 306. Each AC bus bar 304 extends between a first mating end 340 and a second mating end 342. The AC bus bar 304 includes a plate, which may be stamped and formed into an appropriate shape to position the first mating end 340 for electrical connection with the AC terminal 300 and the second mating end 342 for electrical connection with the AC connector 500. In the illustrated embodiment, the AC bus bars 304 are right angle bus bars having the first mating ends 340 oriented generally perpendicular to the second mating ends 342. For example, the first mating ends 340 may extend generally parallel to the AC terminals 300 and the second mating ends 342 may extend generally perpendicular to the AC terminals 300. In an exemplary embodiment, the second mating ends 342 include separable mating interfaces 344 for mating with the AC connector 500. In the illustrated embodiment, the second mating ends 342 form blade contacts configured to be plugged into socket contacts of the AC connector 500. Other types of separable mating interfaces may be provided in alternative embodiments.

Figure 13:
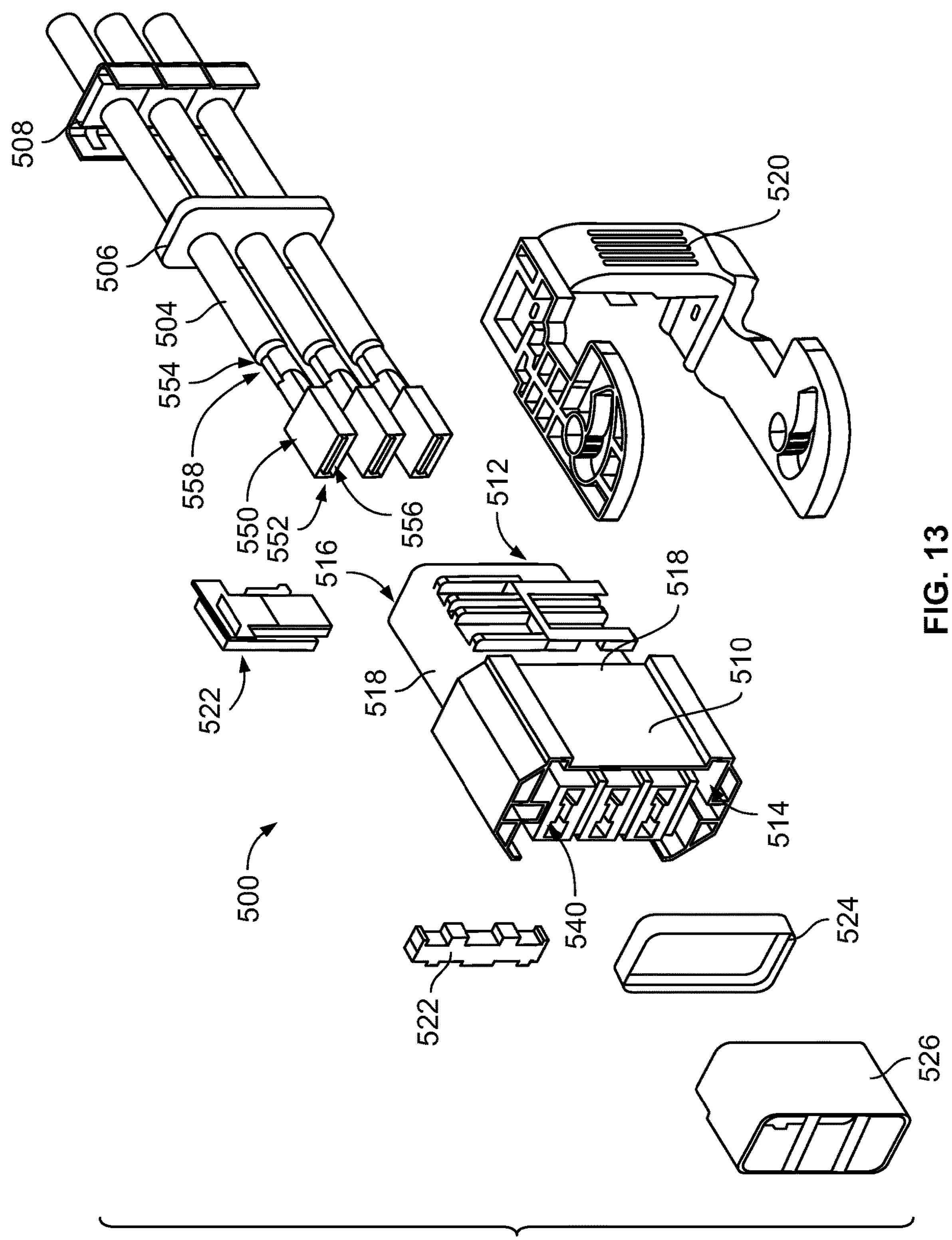
FIG. 13 is an exploded view of an AC connector of the charging inlet assembly in accordance with an exemplary embodiment.

FIG. 13 is an exploded view of the AC connector 500 in accordance with an exemplary embodiment. The AC connector 500 includes the AC contacts 550 coupled to ends of the AC power cables 504. The AC contacts 550 and the AC power cables 504 may be loaded into a cavity 512 of the AC connector housing 510. In an exemplary embodiment, the AC connector 500 includes individual contact channels 540 used to hold the AC contacts 550. The AC contacts 550 may be aligned with each other, such as in a vertical stack. In an exemplary embodiment, the AC connector housing 510 is manufactured from a dielectric material, such as a plastic material, to electrically isolate the AC contacts 550 from one another.

Each AC contact 550 extends between a mating end 552 and a terminating end 554. In various embodiments, the mating ends 552 of the AC contacts 550 includes sockets 556 configured to receive the mating ends 342 of corresponding AC terminals 300. Other types of separable mating ends may be provided in alternative embodiments, such as plum contacts, blade contacts, deflectable beam contact, and the like. The terminating end 554 is configured to be terminated to the AC power cable 504. In an exemplary embodiment, the AC contacts 550 have crimp barrels 558 that may be crimped to the ends of the AC power cables 504. However, the AC contacts 550 may be terminated by other means in alternative embodiments, such as being welded to ends of the AC power cables 504.

The AC connector housing 510 extends between a mating end 514 and a cable end 516 opposite the mating end 514. However, in alternative embodiments, the AC connector housing 510 may be a right-angle connector housing having the cable end 516 oriented perpendicular to the mating end 514. The AC connector housing 510 includes side walls 518 between the mating end 514 and the cable end 516. The side walls 518 surround the cavity 512. In an exemplary embodiment, the AC connector housing 510 includes a lever 520 for securing the AC connector 500 to the rear housing 120. The lever 520 is actuated to plug the AC connector 500 onto the AC connector shroud 150 of the rear housing 120. For example, rotation of the lever 520 holds the AC connector 500 onto the AC connector shroud 150. In an exemplary embodiment, the AC connector housing 510 may include one or more contact position assurance devices 522 to ensure that the AC contacts 550 are properly positioned in the AC connector housing 510. In an exemplary embodiment, the AC connector housing 510 includes a perimeter seal 524 to provide a seal between the AC connector 500 and the AC connector shroud 150. The perimeter seal 524 may be received in the cavity 512. A perimeter seal retainer 526 may be used to retain the perimeter seal 524 in the cavity 512.

During assembly, the AC contacts 550 and the AC power cables 504 are loaded into the AC connector housing 510. For example, the AC contacts 550 and the AC power cables 504 may be loaded into the cavity 512 through the cable end 516. In an exemplary embodiment, a cable seal 506 is provided at the end of each AC power cable 504. The cable seal 506 may be loaded into the cavity 512 to provide a seal between the AC power cable 504 and the AC connector housing 510. In an exemplary embodiment, a strain relief 508 is provided at the end of each AC power cable 504. The strain relief 508 may be latchably coupled to the AC connector housing 510 to secure the strain relief 508 relative to the AC connector housing 510. The strain relief 508 provide strain relief for the AC power cable 504.

Returning to FIGS. 3 and 4, during assembly, the DC terminals 200 are received in the housing 110 and configured to be electrically connected to the DC connector 400 at the separable mating interface 402. For example, the DC connector 400 may be plugged onto the DC connector shroud 140. The DC contacts 450 are mated with the DC terminals 200 using the threaded fasteners 420 after the DC connector 400 is plugged onto the DC connector shroud 140. Alternatively, the DC terminals 200 may be coupled to the DC connector 400 using the threaded fasteners 420 prior to loading the DC terminals 200 into the housing 110. For example, the DC terminals 200 may be loaded into the housing with the DC connector 400 as the DC connector 400 is mated to the DC connector shroud 140. In such embodiments, the DC contacts 450 may be uncoupled from the DC terminals 200 by loosening the threaded fasteners 420 to allow the DC connector 400 to be removed from the DC connector shroud 140 without removing the DC terminals 200 from the housing 110. Alternatively, the DC terminals 200 may be removed with the DC connector 400 by unlatching the DC terminals 200 from the housing 110 to allow the DC connector 400 to be removed from the DC connector shroud 140.

The AC assembly 302 is received in the housing 110 and configured to be electrically connected to the AC connector 500 at the separable mating interface 502. For example, the AC connector 500 may be plugged onto the AC connector shroud 150. The AC contacts 550 are mated with the AC bus bars 304 when the AC connector 500 is coupled to the AC connector shroud 150. The lever 520 is used to secure the AC connector 500 to the AC connector shroud 150. The AC connector 500 may be removed from the AC connector shroud 150 by opening the lever 520 and unplugging the AC connector 500 from the AC connector shroud 150.

Figure 14:
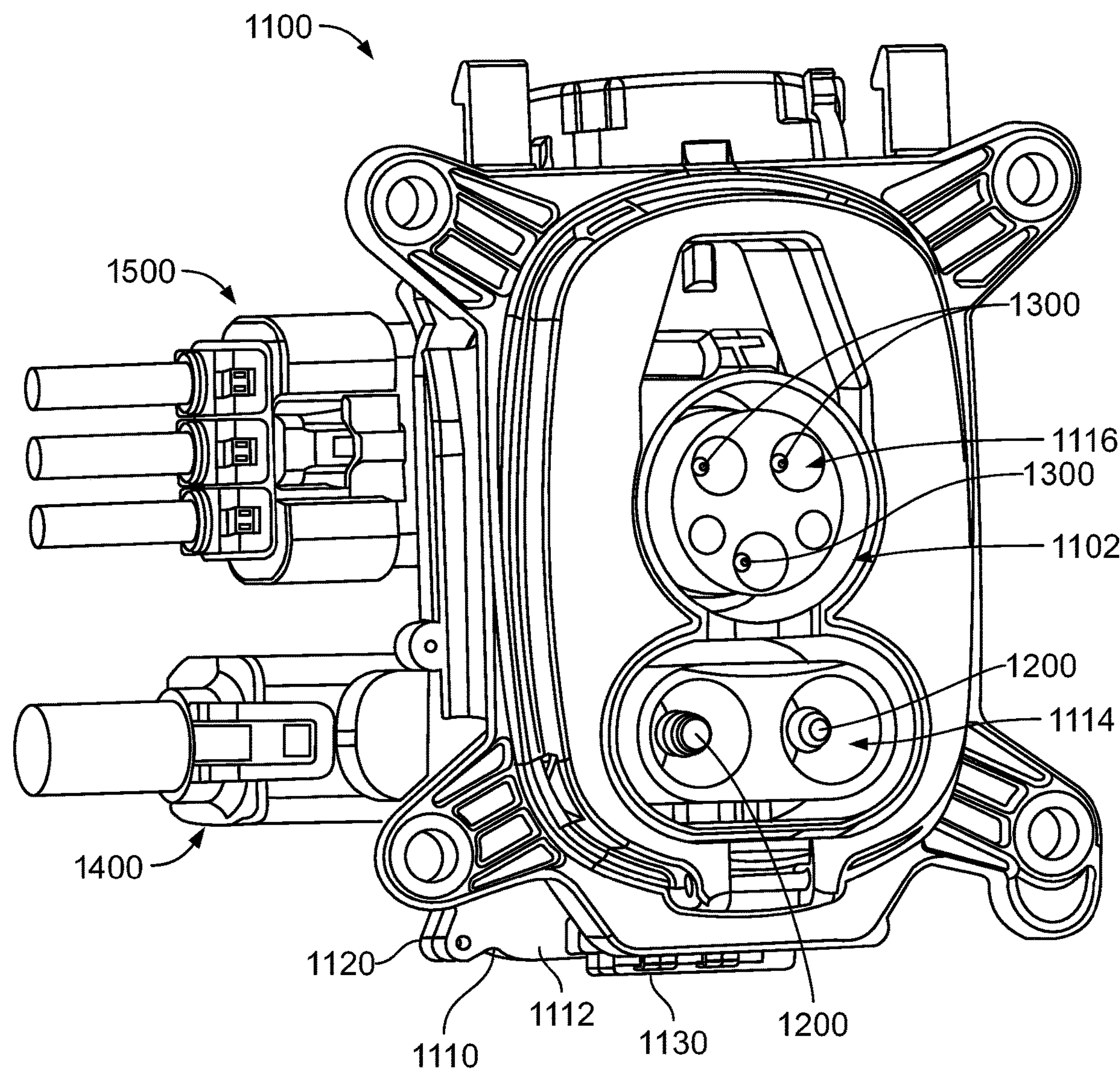
FIG. 14 is a front perspective view of a charging inlet assembly in accordance with an exemplary embodiment.
Figure 15:
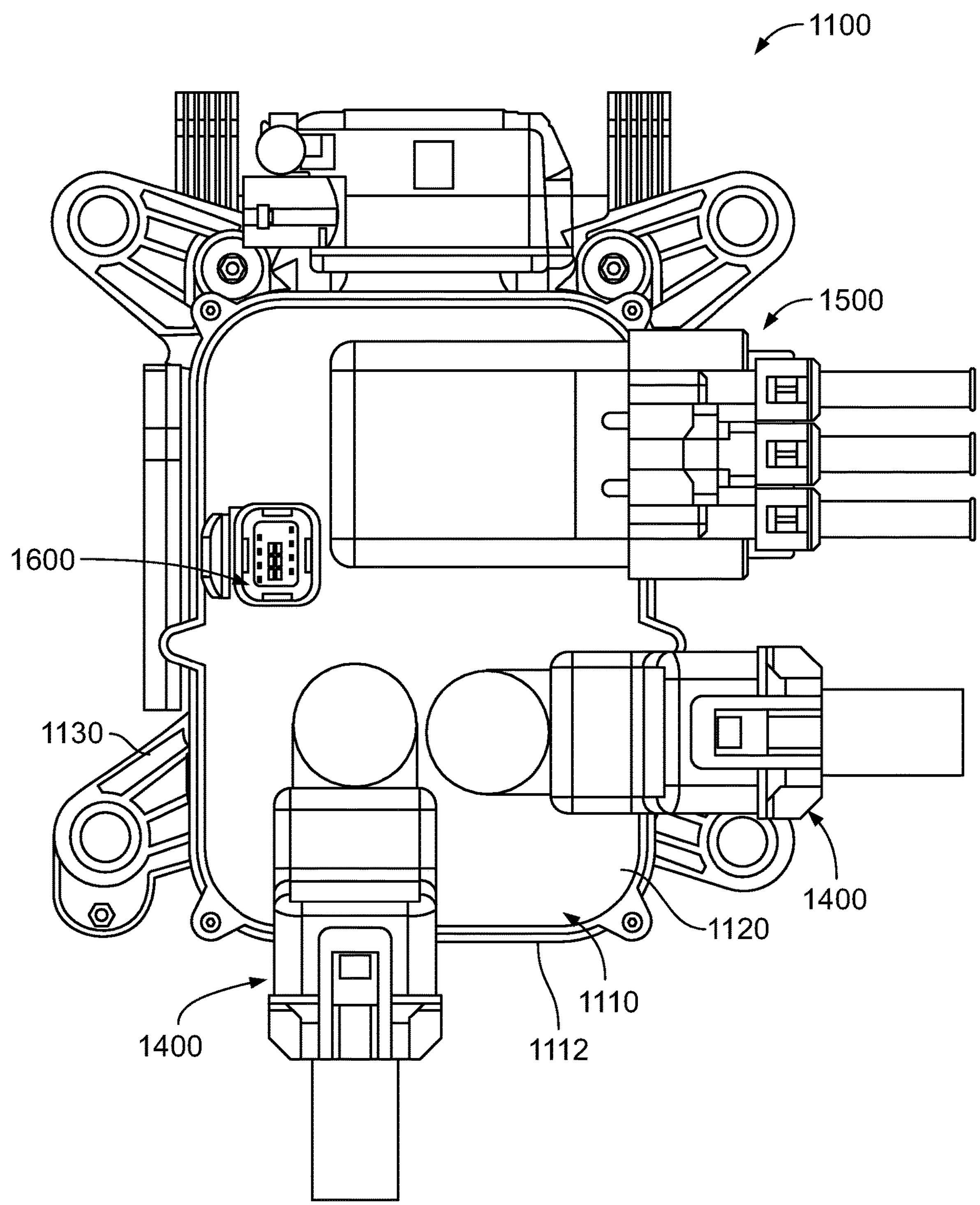
FIG. 15 is a rear perspective view of the charging inlet assembly shown in FIG. 14 in accordance with an exemplary embodiment.
Figure 16:
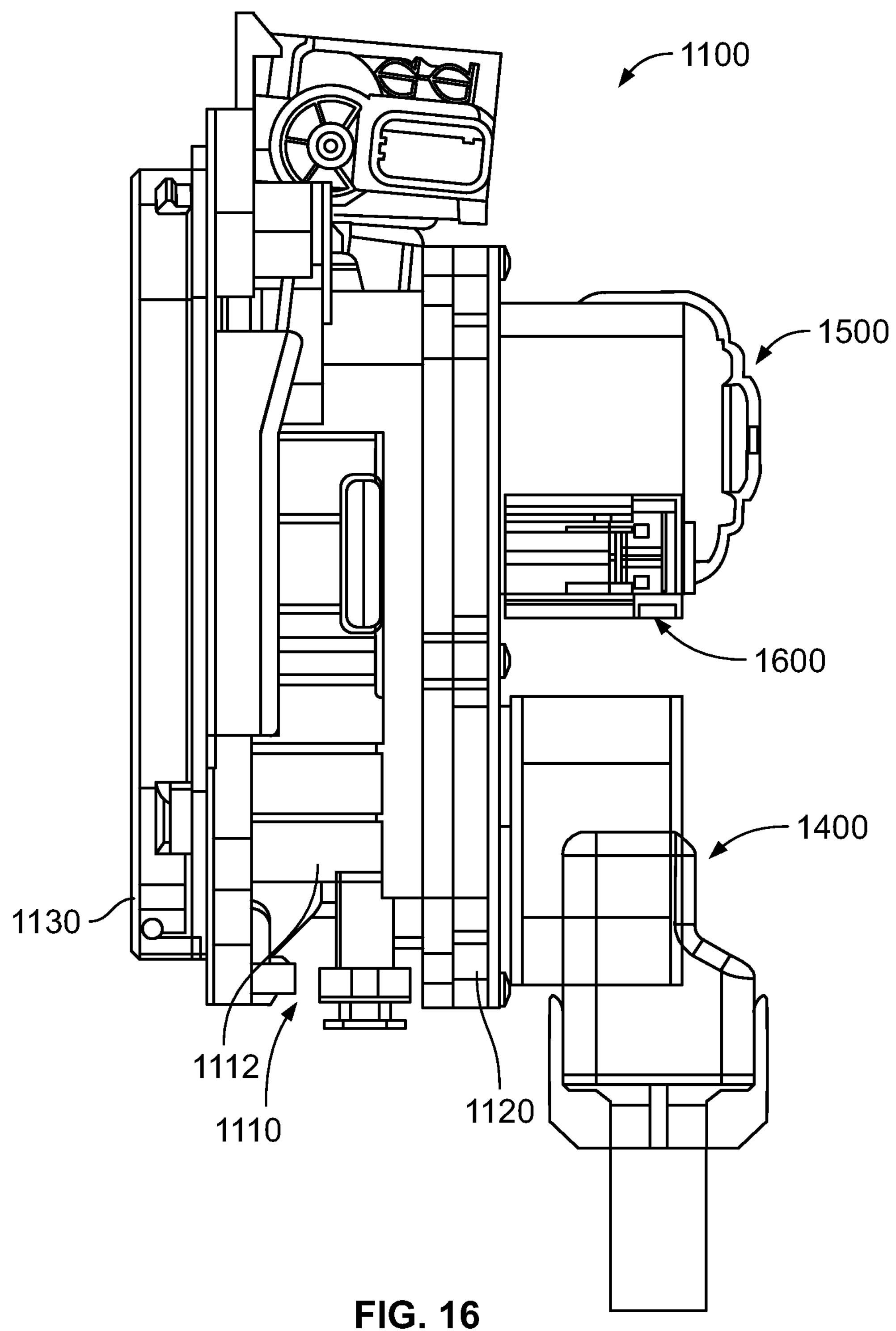
FIG. 16 is a side view of the charging inlet assembly shown in FIG. 14 in accordance with an exemplary embodiment.

FIG. 14 is a front perspective view of a charging inlet assembly 1100 in accordance with an exemplary embodiment. FIG. 15 is a rear perspective view of the charging inlet assembly 1100 in accordance with an exemplary embodiment. FIG. 16 is a side view of the charging inlet assembly 1100 in accordance with an exemplary embodiment. The charging inlet assembly 1100 is similar to the charging inlet assembly 100 shown in FIG. 1 and may include similar components; however, the charging inlet assembly 1100 includes a pair of DC connectors 1400 (shown in FIG. 15) rather than a single DC connector as shown with the charging inlet assembly 100. The charging inlet assembly 1100 includes a power connector 1102 configured to be electrically connected to a charging connector (not shown) for charging a battery system of a vehicle, such as an electric vehicle (EV) or hybrid electric vehicle (HEV).

The charging inlet assembly 1100 includes a housing 1110 holding the various components of the charging inlet assembly 1100. In an exemplary embodiment, the housing 1110 is a multi-piece housing including a main housing 1112, a rear housing 1120 coupled to the rear of the main housing 1112, and a front housing 1130 coupled to a front of the main housing 1112. The housing 1110 holds DC terminals 1200 and AC terminals 1300 forming part of the power connector 1102. The DC terminals 1200 are received in corresponding terminal channels 1114 of the main housing 1112 and the AC terminals 1300 are received in corresponding terminal channels 1116 of the main housing 1112.

The DC terminals 1200 are configured to be electrically connected to removable DC connectors 1400. For example, the DC connectors 1400 are removably coupled to the rear housing 1120 to allow repair or replacement of components of the charging inlet assembly 1100 without removing the housing 1110 from the vehicle.

The AC terminals 1300 are configured to be electrically connected to a removable AC connector 1500. The removable AC connector 1500 may be identical to the AC connector 500. For example, the AC connector 1500 may be coupled to an AC terminal assembly 1302. In an exemplary embodiment, the charging inlet assembly 1100 further includes a low voltage (LV) connector 1600 configured to be removably coupled to the rear housing 1120. The LV connector 1600 may be identical to the LV connector 600.

Figure 17:
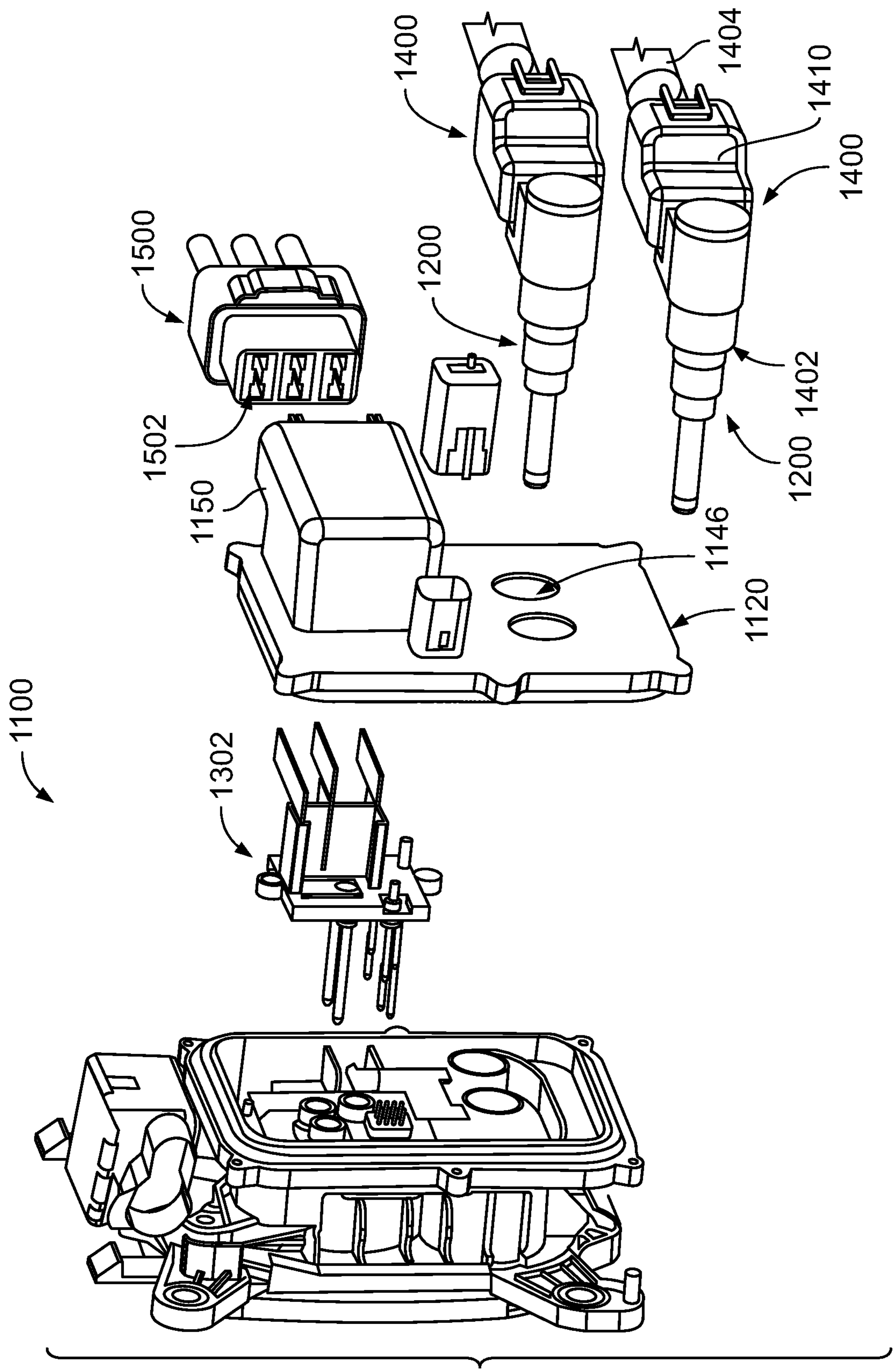
FIG. 17 is an exploded view of the charging inlet assembly shown in FIG. 14 in accordance with an exemplary embodiment.

FIG. 17 is an exploded view of the charging inlet assembly 1100 in accordance with an exemplary embodiment showing the DC connectors 1400 and the AC connector 1500 poised for coupling to the rear of the charging inlet assembly 1100. The DC connectors 1400 are configured to be coupled to the rear housing 1120 at separable interfaces 1402. The AC connector 1500 is configured to be coupled to the rear housing 1120 at a separable interface 1502. For example, the AC connector 1500 configured to be removably coupled to the AC connector shroud 1150 for mating with the AC terminal assembly 1302.

Each DC connector 1400 includes a DC connector housing 1410 holding a DC contact 1450, which is electrically connected to a corresponding DC power cable 1404. In an exemplary embodiment, the rear housing 1120 of the charging inlet assembly 1100 includes openings 1146 that receive the corresponding DC contact 1450 and/or the DC terminal 1200. The rear housing 1120 may include a DC connector shroud for securing the DC connector housing 1410 to the rear housing 1120. The DC connectors 1400 may be mated to the rear housing 1120 at various angles to control the exit directions of the DC power cables 1404. For example, the DC power cables 1404 may extend from a first side and/or a second side and/or a bottom of the rear housing 1120 by changing mounting orientations of the DC connectors 1400 relative to the rear housing 1120.

Figure 18:
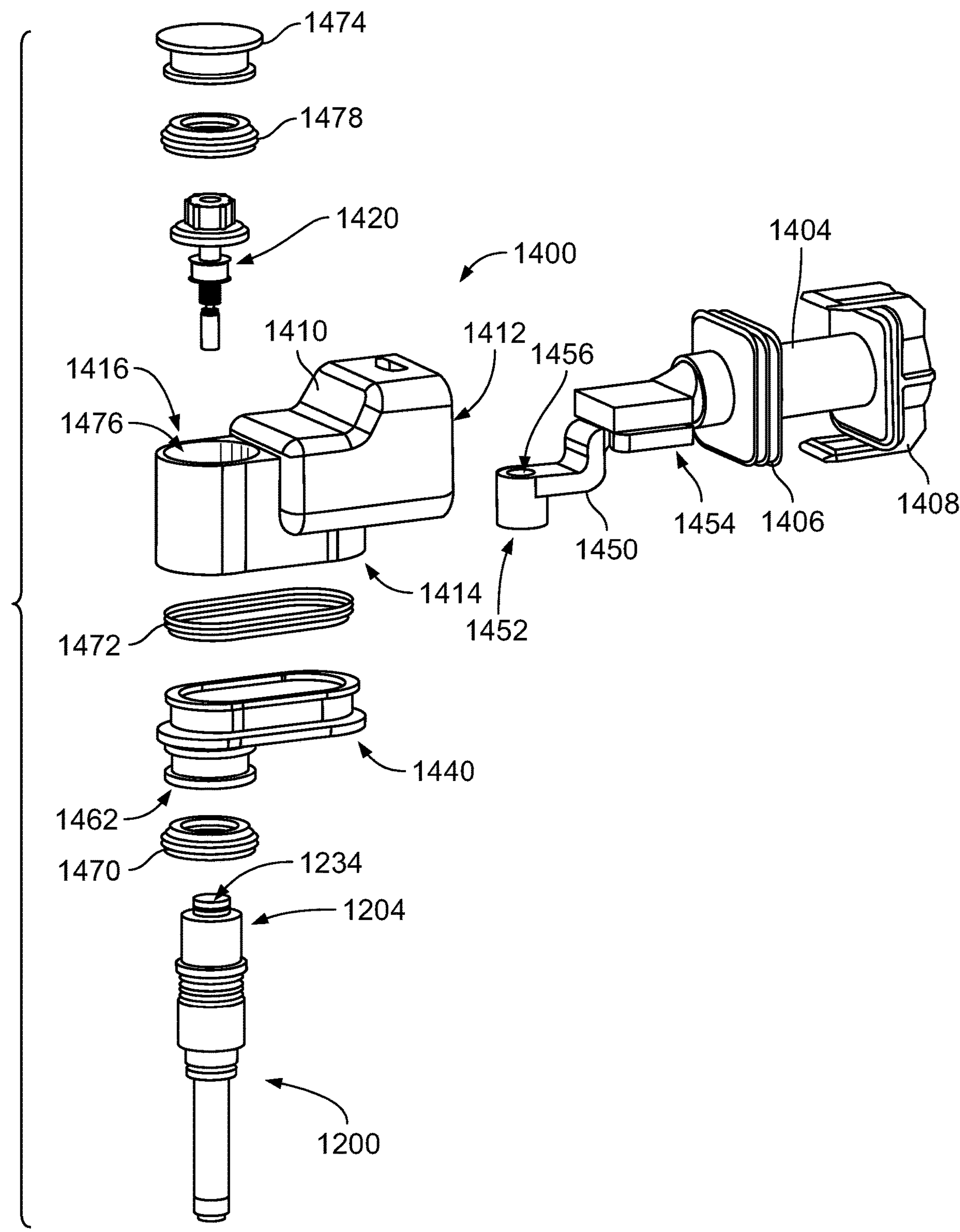
FIG. 18 is an exploded view of a DC connector and corresponding DC terminal of the charging inlet assembly shown in FIG. 14 in accordance with an exemplary embodiment.

FIG. 18 is an exploded view of one of the DC connectors 1400 and corresponding DC terminal 1200 in accordance with an exemplary embodiment. The DC connector 1400 includes the DC contacts 1450 coupled to ends of the DC power cables 1404. The DC contact 1450 may be a busbar in various embodiments. The DC contacts 1450 and the DC power cables 1404 may be loaded into a cavity 1412 of the DC connector housing 1410. In an exemplary embodiment, a cable seal 1406 is provided at the end the DC power cable 1404. The cable seal 1406 may be loaded into the DC connector housing 1410 provide a seal between the DC power cable 1404 and the DC connector housing 1410. In an exemplary embodiment, a strain relief 1408 is provided at the end of the DC power cable 1404. The strain relief 1408 may be latchably coupled to the DC connector housing 1410 to secure the strain relief 1408 relative to the DC connector housing 1410. The strain relief 1408 provides strain relief for the DC power cable 1404.

In an exemplary embodiment, the DC connector 1400 includes a threaded fastener 1420 used to mechanically and electrically couple the DC contact 1450 and the DC terminal 1200 at a separable mating interface. The threaded fastener 1420 is configured to be received in a threaded bore 1234 of the DC terminal 1200 to mechanically and electrically connect the DC contact 1450 to the DC terminal 1200. The threaded fastener 1420 is configured to extend through and couple to the DC contact 1450. For example, the DC contact 1450 includes a mating end 1452 that receives the threaded fastener 1420. In an exemplary embodiment, the mating end 1452 includes an opening 1456 configured to receive the threaded fastener 1420. Optionally, the opening 1456 may be threaded. Alternatively, the opening 1456 may be a smooth bore allowing the threaded fastener 1420 to pass therethrough for mating to and unmated from the DC terminal 1200. The DC contact 1450 includes a terminating end 1454 opposite the mating end 1452. The terminating end 1454 is configured to be terminated to the DC power cable 1404. In an exemplary embodiment, the DC contact 1450 may be welded to the DC power cable 1404. However, the DC contact 1450 may be terminated by other means in alternative embodiments, such as being crimped to ends of the DC power cable 1404.

In an exemplary embodiment, the DC connector 1400 includes a contact holder 1440 used to hold the DC contact 1450. The contact holder 1440 may be received in the cavity 1412 to position the DC contact 1450 relative to the DC connector housing 1410 and/or the DC terminal 1200. The contact holder 1440 may receive a terminating end 1204 of the DC terminal 1200. In an exemplary embodiment, the contact holder 1440 is manufactured from a dielectric material, such as a plastic material. In an exemplary embodiment, the contact holder 1440 includes a port 1462 at a front of the contact holder 1440. The port 1462 may be plugged into the rear housing 1120 when the DC connector 1400 is coupled to the rear housing 1120. In an exemplary embodiment, a cover seal 1470 may be provided at the front 1414 of the DC connector housing 1410. The cover seal 1470 surrounds the port 1462 and is configured to engage the rear housing 1120 to seal the DC connector 1400 to the rear housing 1120. In an exemplary embodiment, a peripheral seal 1472 is coupled to an outer perimeter of the contact holder 1440. The peripheral seal 1472 is received in the cavity 1412 at the front 1414 and engages the DC connector housing 1410 to seal off the opening at the front of the DC connector housing 1410. In an exemplary embodiment, a rear cover 1474 is coupled to the rear 1416 of the DC connector housing 1410 to close a rear opening 1476. A peripheral seal 1478 is configured to be coupled to the rear cover 1474 to seal off the rear opening 1476.

A DC terminal subassembly is provided, which can be assembled into the housing 1110 at various orientations, such as 0°, 90°, 180°, or 270° orientations or other non-right-angle orientations. The DC contact 1450 may be modified to route around other DC terminal 1200, such as for the 0° and 180° exit directions. The DC terminal 1200 can be assembled to the housing 1110 prior to assembly with the DC contact 1450 or after. After the DC contact 1450 is mated to the DC terminal 1200, the threaded fastener 1420 may be torqued to mechanically and electrically connect the DC contact 1450 to the DC terminal 1200. The threaded fastener 1420 is removable to form a separable interface for repair/replacement of the components.

In various embodiments, a charging inlet assembly is provided having a low profile. The charging inlet assembly reduces packaging space inside of the vehicle and provides different cable routing designs to allow use in different vehicle platforms without significant redesign of entire components or features of the charging inlet assembly. Various embodiments and configurations of the charging inlet assembly are provided that allow replacement of defective components of the charging inlet assembly without replacement of the entire charging inlet assembly. The replaceability of the various components of the charging inlet assembly increases vehicle serviceability and reduces replacement and repair costs of the charging inlet assembly components.

In various embodiments, the charging inlet assembly employs threaded connections on the direct current (DC) circuit terminals to improve ease of assembly, streamline package size, and offer flexibility with cable exit direction. In various embodiments, the charging inlet assembly incorporates a connector on the alternating current (AC) circuit and a connector on the low voltage (LV) circuit that connects directly into the rear of the housing. The connectorized design for the circuits of the charging inlet assembly simplifies the connection of the harnesses and terminals/contacts (for example, three 16 $mm^2$ cables, two 95 $mm^2$ cables, and seven signal wires) and eliminates the need for complex cable connections inside of the charging inlet housing. Various embodiments of the connectorized harness assemblies incorporates busbars on the AC and DC circuits. Various embodiments use ultrasonic welding and/or bolted joints to minimize interface resistance while offering separable joints for repair/replacement of components. Separating the cables/wires from a single harness to multiple separate cable harnesses allows improved cable management. Various embodiments of the charging inlet assembly accommodates multiple DC and AC cable exit directions, such as with slight changes to the rear cover.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A charging inlet assembly for an electric vehicle comprising:

a housing extending between a front and a rear, the housing having a chamber at the rear, the housing having a power connector at the front for receiving a charging connector, the power connector including AC terminal channels and DC terminal channels between the front and the rear;

AC terminals coupled to the housing, each of the AC terminals including a mating pin and a terminating end opposite the mating pin, the mating pin positioned in the corresponding AC terminal channel for mating with the charging connector, the terminating end positioned in the chamber at the rear of the housing;

an AC terminal assembly received in the housing, the AC terminal assembly including AC bus bars electrically connected to corresponding AC terminals, each of the AC bus bars including a separable mating interface configured to be electrically connected to AC contacts of an AC connector removably coupled to the housing; and DC terminals coupled to the housing, each of the DC terminals including a mating pin and a terminating end opposite the mating pin, the mating pin positioned in the corresponding DC terminal channel for mating with the charging connector, the terminating end positioned in the chamber at the rear of the housing, the terminating end including a threaded element configured to mate with a mating threaded element of a DC connector to mechanically and electrically connect to a DC contact of the DC connector removably coupled to the housing.

2. The charging inlet assembly of claim 1, wherein the threaded elements include threaded bores configured to receive threaded fasteners defining the mating threaded elements.

3. The charging inlet assembly of claim 1, wherein the threaded elements allow the DC connector to mate to and unmate from the housing without removing the DC terminals from the housing.

4. The charging inlet assembly of claim 1, wherein the housing includes a DC connector shroud including a receptacle configured to pluggably receive the DC connector, the terminating ends of the DC terminals being exposed in the DC connector shroud for mating with the DC connector.

5. The charging inlet assembly of claim 1, wherein the housing includes an AC connector shroud including a receptacle configured to pluggably receive the AC connector, the terminating ends of the AC terminals being exposed in the AC connector shroud for mating with the AC connector.

6. The charging inlet assembly of claim 1, wherein the AC bus bars are right angle bus bars configured to mate with the AC connector in a mating direction perpendicular to the AC terminals.

7. The charging inlet assembly of claim 1, wherein the AC bus bars each include a first mating end and a second mating end, the first mating end being electrically connected to the corresponding AC terminal, the second mating end including a blade defining the separable mating interface of the corresponding AC bus bar.

8. The charging inlet assembly of claim 1, wherein the AC terminal assembly includes a printed circuit board, at least one of the AC terminals being electrically connected to the printed circuit board.

9. The charging inlet assembly of claim 8, wherein the AC terminal assembly includes at least one of a pilot terminal and a proximity terminal extending to the front of the housing for connecting with the charging connector and being electrically connected to the printed circuit board.

10. A charging inlet assembly for an electric vehicle comprising:

a housing extending between a front and a rear, the housing having a chamber at the rear, the housing having a power connector at the front for receiving a charging connector, the power connector including AC terminal channels and DC terminal channels between the front and the rear;

AC terminals coupled to the housing, each of the AC terminals including a mating pin and a terminating end opposite the mating pin, the mating pin positioned in the corresponding AC terminal channel for mating with the charging connector, the terminating end positioned in the chamber at the rear of the housing;

an AC terminal assembly received in the housing, the AC terminal assembly including AC bus bars electrically connected to corresponding AC terminals, each of the AC bus bars including a mating interface;

an AC connector having an AC connector housing coupled to the rear of the housing, the AC connector including AC contacts held by the AC connector housing, the AC connector including AC power cables extending into the AC connector housing being terminated to the AC contacts, each of the AC contacts having a separable contact interface mated with the mating interface of the corresponding AC bus bar when the AC connector is coupled to the housing and unmated from the AC bus bar when the AC connector is uncoupled from the housing;

DC terminals coupled to the housing, each of the DC terminals including a mating pin and a terminating end opposite the mating pin, the mating pin positioned in the corresponding DC terminal channel for mating with the charging connector, the terminating end positioned in the chamber at the rear of the housing; and a DC connector having at least one DC connector housing coupled to the rear of the housing, the DC connector including DC contacts held by the DC connector at least one housing, the DC connector including DC power cables extending into the at least one DC connector housing being terminated to the DC contacts, each of the DC contacts having a separable contact interface configured to be electrically connected to the corresponding DC terminal.

11. The charging inlet assembly of claim 10, wherein the at least one DC connector housing includes a single DC connector housing having a cavity receiving each of the DC contacts and each of the DC power cables.

12. The charging inlet assembly of claim 10, wherein the at least one DC connector housing includes a plurality of DC connector housings independently coupled to the housing, each DC connector housing including a single one of the DC contacts and a single one of the DC power cables.

13. The charging inlet assembly of claim 10, wherein the DC connector includes seals coupled to the at least one DC connector housing, the seals engaging the housing to provide a sealed mating interface between the DC connector and the housing.

14. The charging inlet assembly of claim 10, wherein the terminating ends of the DC terminals include threaded elements, the DC connector including threaded elements configured to mate with the threaded elements of the DC terminals to mechanically and electrically connect the DC contacts to the DC terminals.

15. The charging inlet assembly of claim 10, wherein the housing includes a DC connector shroud including a receptacle configured to pluggably receive the DC connector, the terminating ends of the DC terminals being exposed in the DC connector shroud for mating with the DC connector.

16. The charging inlet assembly of claim 10, wherein the housing includes an AC connector shroud including a receptacle configured to pluggably receive the AC connector, the terminating ends of the AC terminals being exposed in the AC connector shroud for mating with the AC connector.

17. The charging inlet assembly of claim 10, wherein the AC bus bars each include a first mating end and a second mating end, the first mating end being electrically connected to the corresponding AC terminal, the second mating end including a blade defining the separable mating interface of the corresponding AC bus bar.

18. A charging inlet assembly for an electric vehicle comprising:

a housing extending between a front and a rear, the housing having a chamber at the rear, the housing having a power connector at the front for receiving a charging connector, the power connector including DC terminal channels between the front and the rear;

DC terminals coupled to the housing, the DC terminals including mating pins and terminating ends opposite the mating pins, the mating pins positioned in the corresponding DC terminal channels for mating with the charging connector, the terminating ends positioned in the chamber at the rear of the housing, the terminating ends including threaded elements; and a DC connector having at least one DC connector housing coupled to the rear of the housing, the DC connector including DC contacts held by the at least one DC connector housing, the DC connector including DC power cables extending into the at least one DC connector housing being terminated to the DC contacts, the DC contacts having mating ends, the DC connector including mating threaded elements coupled to the mating ends of the DC contacts and configured to be threadably coupled to the threaded elements at the terminating ends of the DC terminals to define separable mating interfaces between the DC contacts and the DC terminals for mating and unmating the DC connector from the housing.

19. The charging inlet assembly of claim 18, wherein the at least one DC connector housing includes a single DC connector housing having a cavity receiving each of the DC contacts and each of the DC power cables.

20. The charging inlet assembly of claim 18, wherein the housing includes a DC connector shroud including a receptacle configured to pluggably receive the DC connector, the terminating ends of the DC terminals being exposed in the DC connector shroud for mating with the DC connector.

* * * * *